(12) United States Patent
Zheng et al.

(10) Patent No.: US 10,821,615 B2
(45) Date of Patent: Nov. 3, 2020

(54) FASTENER

(71) Applicant: ROBOTTIME (BEIJING) TECHNOLOGY CO., LTD., Beijing (CN)

(72) Inventors: Shijie Zheng, Beijing (CN); Xiangao Yao, Beijing (CN)

(73) Assignee: ROBOTTIME (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/664,794

(22) Filed: Oct. 26, 2019

(65) Prior Publication Data

US 2020/0055200 A1 Feb. 20, 2020

Related U.S. Application Data

(63) Continuation of application No. 15/731,191, filed on Apr. 20, 2017, now Pat. No. 10,576,645.

(30) Foreign Application Priority Data

Apr. 20, 2016 (CN) .......................... 2016 1 0248983
Mar. 31, 2017 (CN) .......................... 2017 1 0207608

(51) Int. Cl.
  *B25J 19/00* (2006.01)
  *F16B 17/00* (2006.01)
  *B25J 17/00* (2006.01)

(52) U.S. Cl.
  CPC ............. *B25J 19/007* (2013.01); *B25J 17/00* (2013.01); *F16B 17/00* (2013.01)

(58) Field of Classification Search
  CPC .......... B25J 17/00; B25J 19/007; F16B 17/00; F16B 21/02; F16B 21/04
  See application file for complete search history.

(56) References Cited

U.S. PATENT DOCUMENTS

| 3,842,709 A | 10/1974 | Fuqua |
| 4,270,328 A | 6/1981 | Page et al. |
| 4,936,530 A | 6/1990 | Wollar |
| 5,007,779 A | 4/1991 | Goran |
| 5,586,853 A | 12/1996 | Poe |
| 5,934,729 A | 8/1999 | Baack |

(Continued)

FOREIGN PATENT DOCUMENTS

| CN | 2656578 Y | 11/2004 |
| CN | 103108681 A | 5/2013 |

*Primary Examiner* — Robert Sandy
*Assistant Examiner* — David M Upchurch

(57) ABSTRACT

The device is combination of a fastener and a splicing piece suited with the fastener. The fastener includes a post, a plurality of outer bosses, an outer slab, a first hole and a second inner flange. The plurality of outer bosses are provided in an upper portion of the post. The plurality of outer bosses include a first outer boss, a second outer boss and a third outer boss. The first outer boss is located under the second outer boss. At least a local portion of the splicing piece is a platy portion. Connecting through holes are provided in the platy portion. The connecting through holes include a first through hole. A first inner flange used for being clamped by a lower surface of the first outer boss and an upper surface of the second outer boss is provided on an inner wall of the first through hole.

20 Claims, 25 Drawing Sheets

(56) References Cited

U.S. PATENT DOCUMENTS

| | | | |
|---|---|---|---|
| 6,050,041 A | | 4/2000 | Mowery et al. |
| 6,406,236 B1 | | 6/2002 | Olson, Jr. |
| 6,719,513 B1 | | 4/2004 | Moutousis et al. |
| 6,769,849 B2 | * | 8/2004 | Yoneoka ............... F16B 5/0642 411/41 |
| 6,813,865 B2 | | 11/2004 | Peterson |
| 7,257,870 B2 | * | 8/2007 | Deas ..................... H05K 7/142 24/297 |
| 7,503,528 B2 | * | 3/2009 | Adams .................. F16B 5/0685 24/297 |
| 7,640,707 B2 | | 1/2010 | Johnson et al. |
| 7,891,926 B2 | | 2/2011 | Jackson, Jr. |
| 7,896,601 B2 | | 3/2011 | Kalyanadurga et al. |
| 8,459,920 B2 | | 6/2013 | Selle |
| 8,533,919 B2 | | 9/2013 | Schliessner |
| 9,899,822 B2 | | 2/2018 | Richardson et al. |
| 2003/0044259 A1 | | 3/2003 | Kwilosz |
| 2007/0134073 A1 | | 6/2007 | Shereyk et al. |
| 2007/0261332 A1 | | 11/2007 | Mohiuddin et al. |
| 2010/0162550 A1 | | 7/2010 | Sugiyama et al. |
| 2013/0119208 A1 | * | 5/2013 | Geiger ................... F16L 3/233 248/68.1 |

* cited by examiner

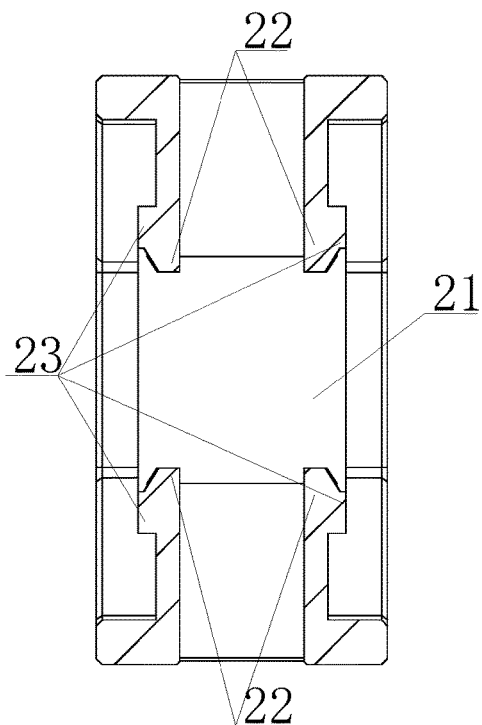
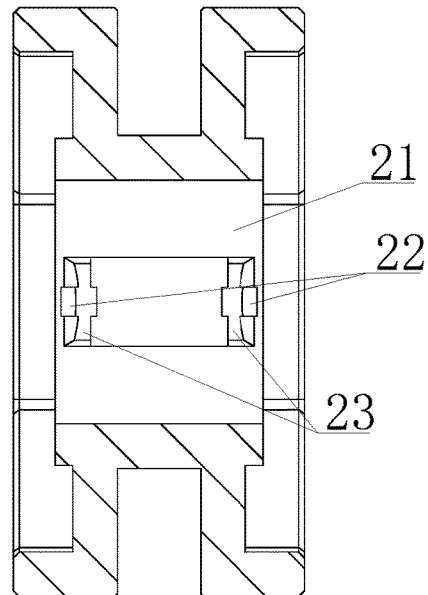
Fig. 11        Fig. 12
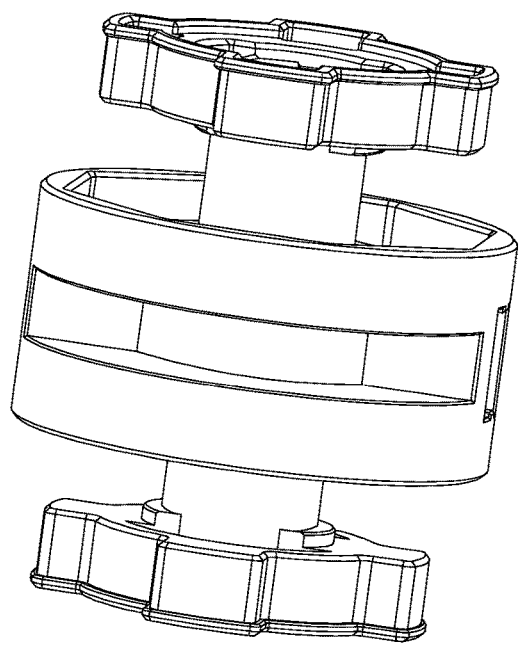
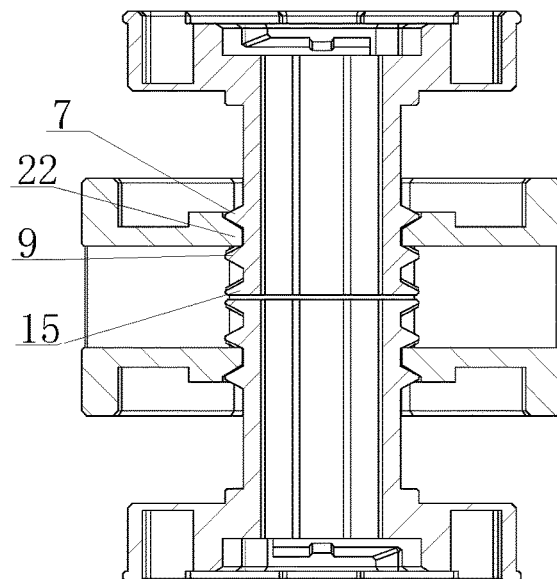
Fig. 13        Fig. 14

FASTENER

RELATED APPLICATIONS

The present application is a continuation application to U.S. Ser. No. 15/731,191 filed Apr. 20, 2017, which claims the benefit of the Chinese patent applications CN201610248983.X filed Apr. 20, 2016 and CN201710207608.5 filed Mar. 31, 2017, each of which is incorporated herein by reference in its entirety.

FIELD OF THE INVENTION

The present invention belongs to the splicing of assembled components for robots. Particularly, the present invention relates to a fastener, and a fastener splicing piece and a fastener connecting member which are suited with this fastener.

BACKGROUND OF THE INVENTION

With the rapid development of robots, various robots have been developed by the science & technology industries in China and abroad. This provides the necessary material condition for the introduction of robots in all walks of life, such as at schools. Existing robot members need to be connected together by means of common connecting members such as screws and sleeves, and the disassembly is relatively difficult. Moreover, due to their small size, the screws are easy to roll and miss. In addition, tools such as screwdrivers are dangerous for children and disadvantageous for the popularization, among the children, of activities that remarkably improve the manipulative ability and thinking ability, such as building up a robot.

OBJECTS AND SUMMARY OF THE INVENTION

To overcome the technical problems in the prior art, the present invention provides a fastener. This fastener directly connects and axially positions splicing pieces, so the assembly efficiency of a robot is improved.

A fastener is provided, including a post, wherein outer bosses are provided in an upper portion of the post, with the outer bosses including a first outer boss and a second outer boss, the first outer boss being located under the second outer boss, the first outer boss and the second outer boss being located at different positions in a length direction of the post, and an upper surface of the first outer boss and a lower surface of the second outer boss being used for clamping a first inner flange on an inner wall of a first through hole of a connected splicing piece; and, an outer slab perpendicular to the post is provided in a lower portion of the post, and the outer slab, the first outer boss and the second outer boss are used for limiting the positions of a plurality of the connected splicing pieces along a height direction of the post.

By providing a first outer boss and a second outer boss in the upper portion of the post and by clamping a first inner flange of a splicing piece using the first outer boss and the second outer boss, the relative axial position of one splicing piece relative to the fastener may be limited. Moreover, the axial positions of other connected splicing pieces may further be limited by fitting the splicing pieces to an upper plane of the outer slab, so that the axial positions of a plurality of splicing pieces on the fastener may be limited without connecting other locking components or fasteners on the top of the fastener. Thus, the number of pieces to be mounted during connection is reduced, and the assembly efficiency of robots is improved.

Preferably, at least one of the upper surface of the first outer boss and the lower surface of the second outer boss is a slope which forms an acute angle with an axis of the post; and, in a plane of the axis of the post, the upper surface of the first outer boss and the lower surface of the second outer boss form a wedge-shaped gap with a smaller interior and a larger exterior.

Preferably, a first bump or a first recess is provided on at least one of the upper surface of the first outer boss and the lower surface of the second outer boss, and a second recess or a second bump matched with the first bump or a third bump matched with the first recess is provided on each of the first inner flange.

Further, preferably, the first outer boss and the second outer boss are oppositely provided in a circumferential direction of the post, and the first outer boss and the second outer boss are provided with a first bump or a first recess facing the other party.

Preferably, first occlusion portions for occluding the first inner flanges are provided on at least one of the first outer boss and the second outer boss.

Further, preferably, the first outer boss and the second outer boss are oppositely provided in a circumferential direction of the post, and first occlusion portions for occluding the first inner flanges are provided on a same side of the first outer boss and the second outer boss.

Preferably, the outer bosses further include a third outer boss which is provided on the top of the post.

Further, preferably, a first hole is formed within a local region of the outer slab under the post, and a second inner flange is provided on an inner wall of the first hole, with the second inner flange having a first gap greater than the width of the third outer boss, and an upper surface of the second inner flange being used for abutting to a lower surface of the third outer boss of the fastener when limiting the position of the connected splicing piece in the height direction of the post.

Preferably, an outer flange is provided on a side face of the outer slab.

To overcome the technical problems in the prior art, the present invention further provides a splicing piece which can be directly connected to a fastener and axially positioned without mounting other pieces, so that the assembly efficiency is improved.

A splicing piece suited with the fastener is provided, wherein at least one local portion of the splicing piece is a platy portion, with a connecting through hole being provided on the platy portion, the connecting through hole including the first through hole, and an first inner flange used for clamping the lower surface of the first outer boss and the upper surface of the second outer boss being provided on the inner wall of the first through hole.

By providing a first inner flange in the through hole of the splicing piece, the splicing piece may be clamped by first and second outer bosses in the upper portion of the post, and the relative axial position of one splicing piece relative to the fastener may be limited. Moreover, the axial positions of other connected splicing pieces may further be limited by fitting the splicing pieces to an upper plane of the outer slab, so that the axial positions of a plurality of splicing pieces on the fastener may be limited without connecting other locking components or fasteners on the top of the fastener. Thus, the number of pieces to be mounted during connection is reduced, and the assembly efficiency of robots is improved.

Preferably, at least one of the upper surface and lower surface of the first inner flange is a slope which forms an acute angle with an axis of the post; the upper surface and the lower surface of the first inner flange form a wedge in a plane of the axis of the post; and, the first inner flange is coordinated with the first outer boss and the second outer boss to realize radial positioning of the splicing piece and the fastener.

Preferably, a second recess or a second bump matched with the first bump or a third bump matched with the first recess is provided on the first inner flange.

Preferably, the connecting through holes further include a second through hole that is an unthreaded hole; an upper positioning flange is provided on at least one of the upper surface of the outer slab of the fastener and a lower portion of an outer circumferential surface of the post; and, the upper positioning flange is used for sheathing the fastener on the underneath one of a plurality of splicing pieces on the post to realize positioning, and the positioning realizes fitting by an outer wall of the upper positioning flange and the inner wall of the second through hole of the underneath splicing piece.

Preferably, the splicing piece is a bar member, the connecting through holes are distributed on a center line of the bar member, and a side bump protruded from a side wall body is further provided on a side wall of the bar member on an outer side of the second through hole.

To overcome the technical problems in the prior art, the present invention provides a fastener connecting member which may connect a plurality of fasteners together.

A fastener connecting member suited with the fastener is provided, wherein the fastener connecting member has a third through hole, and a plurality of third inner flanges used for being clamped by the adjacent outer bosses of the fastener are provided on an inner wall of the third through hole at different heights.

By providing a plurality of third inner flanges, different inner flanges may be coordinated with outer bosses of different fasteners to connect a plurality of fasteners together, so that the length of the fasteners is increased in disguise and more splicing pieces are connected at a same position.

Preferably, at least one of the upper surface and lower surface of each of the third inner flanges is a slope which forms an acute angle with an axis of the post; the upper surface and the lower surface of each of the third inner flanges form a wedge in a plane of the axis of the post; and, the third inner flanges are coordinated with adjacent outer bosses to realize radial positioning of the fastener connecting member and the fastener.

Preferably, a second recess or a second bump matched with the first bump or a fifth bump matched with the first recess is provided on each of the third inner flange.

To overcome the technical problems in the prior art, the preset invention further provides an assembled component. The assembly efficiency of robots is improved if the assembled component is used to assemble robots.

An assembled component is provided, including the fastener and the splicing piece.

When the splicing piece and the fastener are used, the splicing piece may be directly connected to the fastener and axially positioned, without mounting other pieces, so that the assembly efficiency of robots is improved.

Preferably, the assembled component further includes the fastener connecting member.

A plurality of fasteners may be connected together, so the length of the fasteners is increased in disguise and more splicing pieces are connected at a same position.

To overcome the technical problems in the prior art, the present invention provides a fastener which can avoid the potential risk of the use of a screwdriver when robot components are connected by screws in the prior art.

A fastener is provided, including a post, wherein a fifth outer boss is provided in an upper portion of the post, and an outer slab perpendicular to the post is provided in a lower portion of the post, with a second inner flange being provided in an inner wall of the first hole, the second inner flange having a first gap greater than the width of the fifth outer boss, the upper surface of the second inner flange being used for abutting to the lower surface of the fifth outer flange of the fastener when limiting the position of the connected piece in the height direction of the post.

When two fasteners are connected together, the post of the lower fastener extends into a hole of the upper fastener, and the second inner flange of the upper fastener is fastened by the fifth outer flange, so that the axial positions of two connected pieces are limited and the connection of the two connected pieces is realized. Moreover, since the outer slab allows the enveloped shape of other pieces to be conical as a whole and the outer bosses will become factors for hindering the rolling of fasteners, the fastener will not be rolled for a long distance, and the problem of the missing of screws is avoided during the use of screws. More crucially, the disassembly/assembly of screws is realized without tools which are possibly dangerous for children, such as screwdrivers, and the use safety of connecting members for robot pieces is greatly improved.

Preferably, a first recess is provided on the lower surface of the fifth outer boss, and a first bump for being matched with the first recess of the lower fastener is provided on the upper surface of the second inner flange.

Or, a first bump is provided on the lower surface of the fifth outer boss, and a first recess for being matched with the first bump of the lower fastener is provided on the upper surface of the second inner flange.

Further, preferably, a first lower positioning flange is provided on the lower surface of the outer slab, the first lower positioning flange is used for realizing positioning of the upper fastener and a connected piece located above when two fasteners are connected to each other to connect a plurality of connected pieces, and the positioning realizes the coordination by the outer wall of the first lower positioning flange and the connected piece located above.

Preferably, an upper positioning flange used for realizing positioning of fasteners and connected pieces is provided on the upper surface of the outer slab, and the positioning realizes the coordination by the outer wall of the upper positioning flange and connecting through holes of the connected piece located below.

Further, preferably, a positioning rib is provided on an outer side of the post, and an outer surface of the positioning rib coordinates with inner surfaces of first lower positioning flanges of adjacent fasteners when the adjacent fasteners are connected.

Furthermore, preferably, a first limiting block used for limiting a relative rotation angle of the fifth outer boss relative to the second inner flange is provided on the upper surface of the second inner flange.

Furthermore, preferably, a plurality of first outer bumps used for accepting and transferring, to the outer slab, a torque for allowing the fastener to rotate are further provided on an outside surface of the outer slab.

Further, preferably, a first transmission through hole is formed in the middle of the post, and the first transmission through hole is used for allowing a piece to pass through the first transmission through hole to drive the fastener to rotate in a circumferentially relatively fixed manner.

To overcome the technical problems in the prior art, the present invention provides a connecting cap which is matched with the fastener and can avoid the problem in the prior art that the danger to teenagers is possibly caused by a screwdriver when nuts and screws are used to connect various pieces.

A connecting cap suited with the fastener is provided, wherein a second hole is formed in a lower portion of the connecting cap, with a fourth inner flange being provided on an inner wall of the second hole, the fourth inner flange having a second gap greater than the width of the fifth outer flange of the fastener, and an upper surface of the fourth inner flange being used for abutting to the lower surface of the fifth outer boss of the fastener below the connecting cap when limiting the position of the connected piece in the height direction of the post of the fastener.

When splicing pieces are connected via a fastener, the post of the fastener located below extends into a hole of the connecting cap located above, and the fourth inner flange of the connecting cap located above is fastened by the fifth outer boss, so that the axial positions of two connected pieces are limited and the connection of the two connected pieces is realized. More crucially, the disassembly of screws is realized without tools which are possibly dangerous for children, such as screwdrivers, and the use safety of connecting members for robot pieces is greatly improved, so that it is advantageous for the popularization of robots in teenagers.

Preferably, a second bump used for matching with the first recess of the fastener located above is provided on the upper surface of the fourth inner flange;

or, a second recess used for matching with the first bump of the fastener located below is provided on the upper surface of the fourth inner flange.

Further, preferably, a second lower positioning flange is provided on the lower surface of the fourth inner flange; the second lower positioning flange is used for realizing positioning of the connecting cap of the connected piece located above when the connecting cap and the fastener are connected to connect a plurality of connected pieces; and, the positioning realizes the coordination by the outer wall of the second lower positioning flange and the connecting through holes of the connected piece located above.

Preferably, a second limiting block used for limiting a relative rotation angle of the fifth outer boss of the fastener relative to the fourth inner flange is provided on the upper surface of the fourth inner flange.

Further, preferably, a plurality of second outer bumps used for accepting and transferring, to the outer slab, a torque for allowing the connecting cap to rotate are further provided on an outside surface of the connecting cap.

Furthermore, preferably, a second transmission through hole is formed in the middle of the post, and the second transmission through hole is used for allowing a piece to pass through the second transmission through hole to drive the fastener and the connecting cap to rotate together in a circumferentially relatively fixed manner.

To overcome the technical problems in the prior art, the present invention provides an assembled component. During assembling the assembled component, no screwdriver is used, so that the problem in the prior art that the danger to teenagers is possibly caused by a screwdriver when nuts and screws are used to connect various pieces may be avoided.

An assembled component is provided, including:

a moving member, the moving member comprising a bar member having a width and a thickness, the width of the bar member being four times of the thickness, a connecting through hole running through the bar member in a thickness direction of the bar member being provided on the bar member;

a fixed member, a plurality of connecting through holes running through the fixed member in a thickness direction of the fixed member being provided on the fixed member; and a fastener, which is any one fastener described above for passing through the connecting through holes to realize the connection between the moving member and the fixed member.

During assembly, the assembled component is convenient for assembly, and the connection between components is realized by tools possibly causing danger. Moreover, the connection is reliable and will not be unlocked unexpectedly, so that the loose of screws due to the relative rotation between connected pieces is avoided when the screws are used for connection. In addition, a transmission member may also allow to pass therethrough, without influencing the effects of the connected pieces.

Preferably, a third connecting hole and a fourth connecting hole are provided on the moving member and/or the fixed member; the third connecting hole is used for allowing the connected moving member and/or fixed member to do relative rotation when the fastener is connected to another fastener or the fastener is connected to a connecting cap; the fourth connecting hole is used for allowing the connected moving member and/or fixed member to be clamped by the fastener and/or the connecting cap when the fastener is connected to another fastener or the fastener is connected to the connecting cap; and, a thickness of the moving member and/or the fixed member on an edge of the third connecting hole is greater than a thickness of the moving member and/or the fixed member on an edge of the fourth connecting hole.

By configuring the third connecting hole and the fourth connecting hole into statuses of different hole wall heights, a same connecting member may be used and the third connecting hole and the fourth connecting hole may be used for rotatable connection and fixed connection, so that the diversity of connection of pieces is realized while ensuring the universality of the pieces.

BRIEF DESCRIPTION OF FIGURES

FIG. 11 is a sectional view in a direction of FIG. 10;

FIG. 12 is a sectional view in another direction of FIG. 10;

FIG. 13 is a schematic diagram of connecting two fasteners with a fastener connecting member;

FIG. 14 is a sectional view of FIG. 13;

DETAILED DESCRIPTION OF THE EMBODIMENTS

Figure 1:
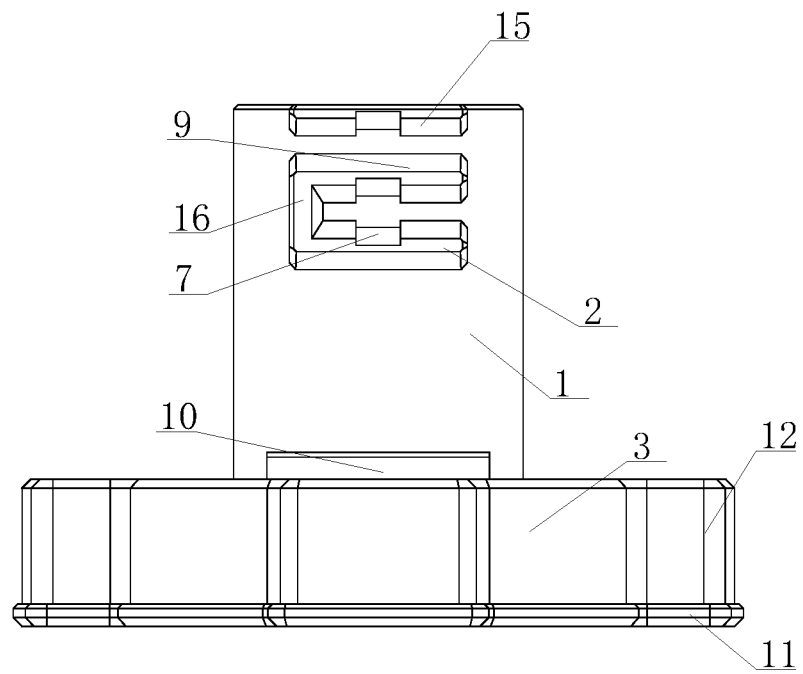
FIG. 1 is a front view of a fastener in Embodiment 1.
Figure 2:
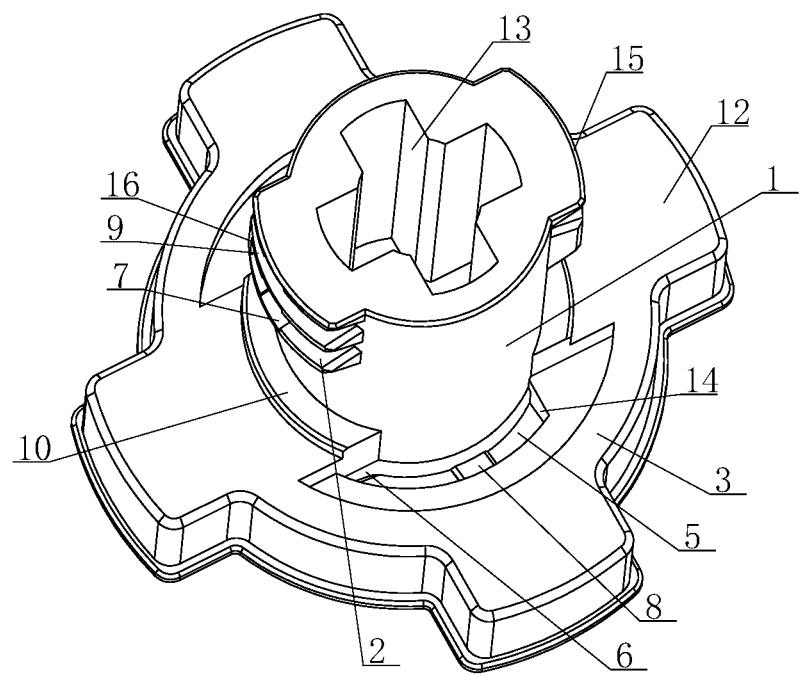
FIG. 2 is a stereoscopic diagram of the fastener in Embodiment 1, when viewed from the inclined top.
Figure 3:
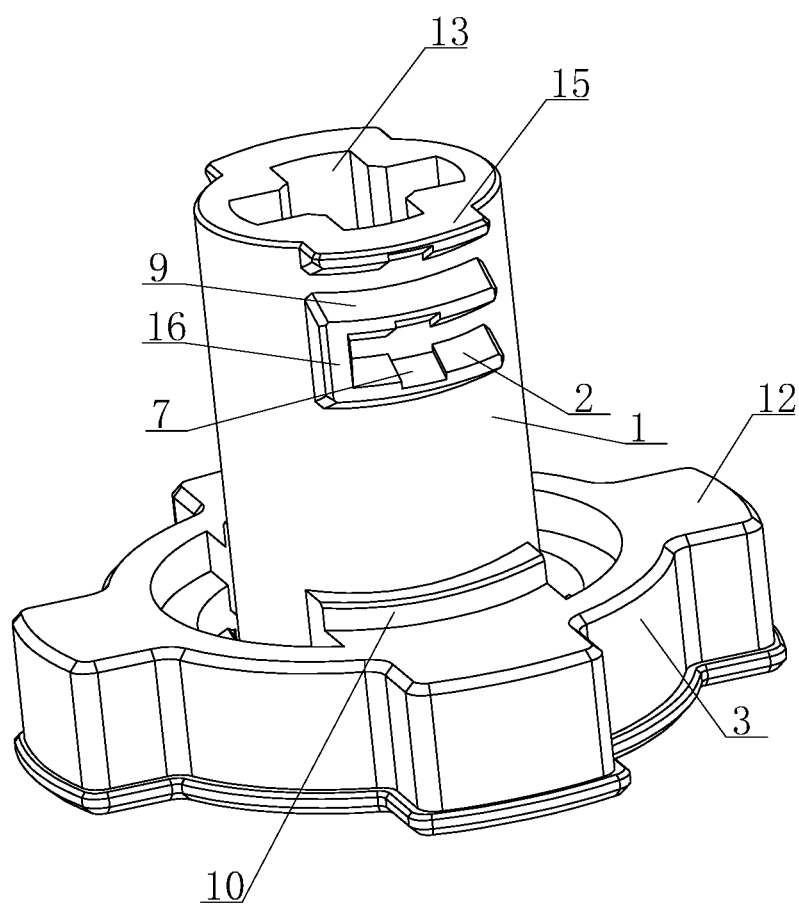
FIG. 3 is a stereoscopic diagram of the fastener in Embodiment 1, when viewed from another angle of the inclined top.
Figure 4:
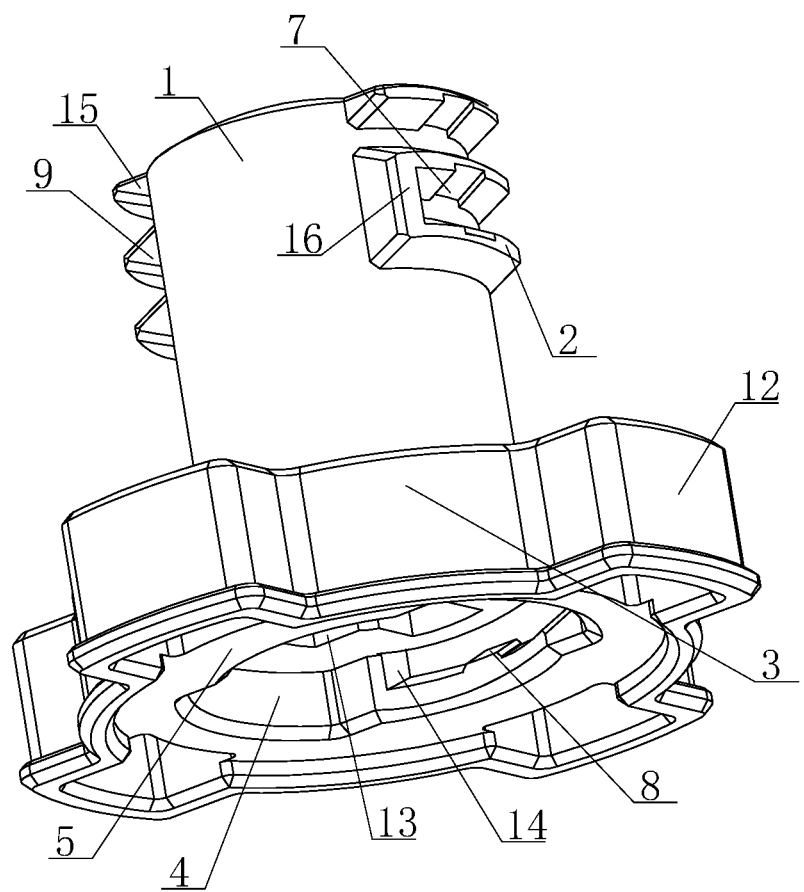
FIG. 4 is a stereoscopic diagram of the fastener in Embodiment 1, when viewed from the inclined bottom.

To further understand the summary, features and effects of the present invention, the following embodiments will be illustrated and described below in detail.

Embodiment 1

In the drawings, the meanings of the reference signs are as follows:

1: post; 2: first outer boss; 3: outer slab; 4: first hole; 5: second inner flange; 6: first gap; 7: first groove; 8: sixth rib; 9: second outer boss; 10: upper positioning flange; 11: outer flange; 12: first outer bump; 13: first transmission through hole; 14: first limiting block; 15: third outer boss; and, 16: first occlusion portion.

A fastener is provided, including a post 1, wherein outer bosses are provided in an upper portion of the post 1, with the outer bosses including first outer bosses 2 and second outer bosses 9, the first outer bosses 2 being located under the second outer bosses 9, the first outer bosses 2 and the second outer bosses 9 being located at different positions in a length direction of the post 1, and an upper surface of each of the first outer bosses 2 and a lower surface of each of the second outer bosses 9 being used for clamping a first inner flange on an inner wall of a first through hole of a connected splicing piece; and, an outer slab 3 perpendicular to the post 2 is provided in a lower portion of the post 1, and the outer slab 3, the first outer bosses 2 and the second outer bosses 9 are used for limiting the positions of a plurality of the connected splicing pieces along a height direction of the post 1.

By providing first outer bosses 2 and second outer bosses 3 in the upper portion of the post 1 and by clamping a first inner flange of a splicing piece using the first outer boss and the second outer boss, the relative axial position of one splicing piece relative to the fastener may be limited. Moreover, the axial positions of other connected splicing pieces may further be limited by fitting the splicing pieces to an upper plane of the outer slab 3, so that the axial positions of a plurality of splicing pieces on the fastener may be limited without connecting other locking components or fasteners on the top of the fastener. Thus, the number of pieces to be mounted during connection is reduced, and the assembly efficiency of robots is improved.

Preferably, at least one of the upper surface of each of the first outer bosses 2 and the lower surface of each of the second outer bosses 9 is a slope which forms an acute angle with an axis of the post 1; and, in a plane of the axis of the post 1, the upper surface of each of the first outer bosses 2 and the lower surface of each of the second outer bosses 9 form a wedge-shaped gap with a smaller interior and a larger exterior.

By configuring the upper surface of each of the first outer bosses 2 and/or the lower surface of each of the second outer bosses 9 into a slope and allowing the both to form a wedge-shaped gap, when the first inner flange is allowed to rotate to a region between the two surfaces, the first through hole can be aligned to the post 1, so that the position accuracy of splicing pieces and the fastener in the radial direction of the fastener is ensured, and the radial positioning of the both is realized without separately providing a spliced positioning component.

Further, preferably, there are two first outer bosses 2 and two corresponding second outer bosses 9. The first outer bosses 2 may extend outward in the radial direction of the post 1. The first outer bosses 2 and the second outer bosses 9 are oppositely provided in a circumferential direction of the post 1. A first groove 7 is provided on the upper surface of each of the first outer bosses 2, a first groove 7 is also provided on the lower surface of each of the second outer bosses 9, and the two first grooves 7 have opposite positions. The upper surface and lower surface of the first inner flange are provided with third ribs matched with each of the first grooves 7.

By providing grooves and ribs on the opposite surfaces of the two bosses, the circumferential positions of the first and second outer bosses relative to the first inner flange may be limited, so that the disengagement of two connected fasteners caused by the relative rotation of the first outer bosses 2 and the first inner flanges due to variation, losing or other reasons is avoided, and the reliability of connection is improved.

By oppositely arranging the first outer bosses 2 and the second outer bosses 9, shorter first inner flanges may be provided in a circumferential direction of the first through hole, that is, the circumferential positioning function of the outer bosses located above and below the first inner flange may be realized. Moreover, by providing the shorter first inner flanges, it means that a gap between first inner flanges with a same height in the first through hole will increase, and the increase of the gap may improve the possibility of inserting the outer bosses into the gap, the time required for inserting a fastener into the first through hole is reduced, and the assembly speed is improved.

Specifically, chamfers are further provided on two side edges of the lower surface of each of the first outer bosses 2, which are parallel to or substantially parallel to the radial direction of the post 1. The chamfers may reduce the resistance when the edges of the lower surface of each of the first outer bosses 2 move on the third ribs, so that it is convenient for users to realize positioning of the first grooves 7 and the third ribs.

Preferably, the first outer bosses 2 and the second outer bosses 9 are oppositely provided in a circumferential direction of the post 1, and first occlusion portions 16 for occluding the first inner flanges are provided on a same side of the first outer bosses 2 and the second outer bosses 9. Where there are multiple combinations of the first outer bosses 2 and the second outer bosses 9, the first occlusion portions 16 between the first outer boss and the second outer boss 9 of each pair of outer bosses should be in a same rotation direction, for example, in a clockwise rotation direction of the first grooves 7, or in a counterclockwise direction of the first grooves 7.

By providing the first occlusion portions 16, the first and second outer bosses 9 may be allowed to stop in the rotation process of the first inner flanges, and the stop positions are positions where the first and second outer bosses 9 are matched with the first recesses/bumps of the first inner flanges, so that, during the rotation, the first bumps/recesses are rotated out from the first grooves 7 after being rotated into the first grooves, and the mounting efficiency is improved. Moreover, the arrangement of the first occlusion portions 16 may also prevent the coordination of the recesses and the bumps from unexpected disengagement, and the reliability of connection is also improved. When the first and second outer bosses 9 are oppositely arranged in the circumferential direction, by providing the first occlusion positions 16 on a same side, the excessive relative rotation amplitude of the first inner flanges with the both is avoided and the first inner flanges are prevent from rotating out from the both, and the relative friction during the rotation is reduced. Particularly, when the outer bosses or the inner flanges have bumps, the abrasion of the bumps to the contact surface may be reduced, and it is advantageous to improve the service life.

Preferably, the outer bosses further include a third outer boss 15 which is provided on the top of the post 1. By providing the third outer boss 15, the fastener may be connected to another fastener or a fastener connecting member, to increase the number of coaxial fasteners and connect more splicing pieces; or, the fastener may be connected to a connecting cap, to further lock a plurality of splicing pieces connected by one fastener and thus improve the reliability of connection.

Further, preferably, a first hole 4 is formed within a local region of the outer slab 3 under the post 1, and a second inner flange 5 is provided on an inner wall of the first hole 4. The second inner flange 5 has a first gap 6 greater than the width of the third outer boss 15. An upper surface of the second inner flange 5 is used for abutting to a lower surface of the third outer boss 15 of the fastener located below when limiting the position of the connected splicing piece in the height direction of the post 1. In this embodiment, two sections of the first inner flange and two sections of the first gap 6 are provided on the inner wall of the first hole 4 in a staggered manner.

By providing a second inner flange 5 in the lower portion of the fastener, the fastener and an adjacent fastener may be connected by the coordination of the second inner flange 5 and the third outer boss 15, so that the number of coaxial fasteners is increased, and more splicing pieces are connected and fixed or have a common axis of rotation.

Specifically, a sixth rib 8 is further provided on the upper surface of the second inner flange. The sixth rib 8 may be coordinated with the groove on the lower surface of the third outer boss 15 to realize the circumferential positioning of two connected fasteners.

Preferably, an outer flange 11 is provided on a side face of the outer slab 3. By providing an outer flange 11 on a side face of the outer slab 3, during disassembling pieces, it is convenient to take out the fastener from the through hole of a splicing piece when the outer flange 11 may be grasped with a fingernail or a finger. In addition, during assembly, by grasping the outer flange 11 with a finger, the finger may be prevented from touching the surface of a splicing piece due to a too close distance to the surface of the connected splicing piece and thus affecting the relative position of the splicing piece.

An upper positioning flange 10 is provided on the upper surface of the outer slab 3 for realizing positioning of the fastener located below and the connected piece located below when a plurality of fasteners are connected together is provided at a junction with the post 1, and the positioning realizes the coordination by the outer wall of the upper positioning flange 10 and the connecting through holes of the connecting piece located below. By the positioning of the upper positioning flange 10 and the connected piece, the relative position of the fastener and the lower one of the connected pieces is ensured to be stable, and the fastener is coordinated with the upper surface of the outer slab 3 to prevent the fastener from shaking on the connected piece.

Specifically, a first limiting block 14 used for limiting a relative rotation angle of the third outer boss 15 relative to the first inner flange is provided on the upper surface of the first inner flange. In this embodiment, the position of the first limiting block 14 is a position where a side face at the front end of the third outer boss 15 in a rotation direction is located, when the groove of the third outer boss exactly moves to the sixth rib.

By providing a first limiting block 14 on the upper surface of the second inner flange 5, it may be avoided that the third outer boss 15 escapes from another first gap 6 of the flange due to excessive rotation amplitude of the third outer boss 15 when two fasteners are connected together. Particularly, when a sixth rib 8 is provided on the upper surface of the second inner flange 5, a first limiting block 14 is provided besides the sixth rib 8, so the third outer stop 15 may be stopped in the rotation process of the second inner flange 15, and the stop position is a position where the groove of the third outer boss 15 is matched with the sixth rib 6 of the second inner flange. Thus, during the rotation, it is avoided that the sixth rib is rotated out from the groove again after being rotated into the groove and the mounting efficiency is improved. Moreover, the arrangement of the first limiting block 14 may also prevent the unexpected disengagement of the sixth rib and the groove of the third outer boss in a certain direction, and the reliability of connection is also improved.

Specifically, four first outer bumps 12 used for accepting and transferring, to the outer slab 3, a torque for allowing the fastener to rotate are further provided on an outside surface of the outer slab 3. By providing the first outer bumps 12, it is convenient for users to hold fasteners and apply an enough torque to connect two fasteners. Particularly, when the first outer bosses 2 and the first inner flanges are cooperatively connected by the first grooves 7 and the first ribs, a certain acting force is to be transferred to the first ribs from the first grooves 7 to ensure the both to engage exactly. Specifically, by providing the first outer bumps 12, the contact length between the outer slab 3 and the connected piece may be increased, and the connection between the fastener and the connected piece may be more stable.

Specifically, a first transmission through hole 13 is formed in the middle of the post 1, and the first transmission through hole 13 is used for allowing a piece to pass through the first transmission through hole 13 to drive the fastener to rotate in a circumferentially relatively fixed manner. In this embodiment, the first transmission through hole 13 has a cross-shaped cross section. Actually, the first transmission through hole 13 may also have an orthohexagonal, square or regularly triangular cross-section, to drive the fastener to rotate via a transmission piece.

By providing the first transmission through hole 13, when a plurality of fasteners are connected together, a center bar may pass through the plurality of fasteners to drive the plurality of fasteners to rotate together. For example, during arranging a robot in form of a vehicle, wheels may be provided on two sides of the vehicle, and each wheel and an arm for mounting the wheel is mounted via the fastener. Specifically, first inner flanges synchronously rotating with the fastener may be provided on the wheels, and positions where the arms are connected to the fasteners may be threaded holes; and, a long bar passes through the fasteners on the two sides of the vehicle to realize the synchronous rotation of the wheels on the two sides. Meanwhile, the bar members or platy pieces connected by the fasteners are not influenced, and the flexibility of the mechanical design is increased. This cannot be realized by the screw connection in the prior art. Moreover, by allowing non-circular pieces to pass through a plurality of fastener caps, a plurality of fasteners may be locked in the circumferential direction to avoid the relative relation between the fasteners and thus improve the reliability of connection, and the anti-rotation effects at first recesses and first bumps may be replaced in a certain sense.

Embodiment 2

To conveniently and quickly show the correspondence, in the drawings, the outer bosses or inner flanges are shown as rectangles. Actually, it is not limited that the outer bosses or inner flanges must be rectangular in this projection direction. Moreover, there are factors not involved the first occlusion portion in the drawings. The new reference signs have the following meanings: 17: first rib; 18: second rib; 19: third rib; and, 20: first inner flange.

This embodiment shows several variants based on Embodiment 1. A difference between these variants and Embodiment 1 mainly lies in that the distribution mode of the first outer boss 2 and the second outer boss 9 and the distribution mode of the recesses and bumps on the outer bosses are different. In Embodiment 1, the first outer boss 2 and the second outer boss 9 are located at same positions of the post in the circumferential direction, first grooves 17 are provided on the upper surface of the first outer boss 2 and the lower surface of the second outer boss 9, and first ribs 17 are provided at same positions of the upper surface and lower surface of the first inner flange 20. Actually, there may be variants in the following forms.

Figure 5:
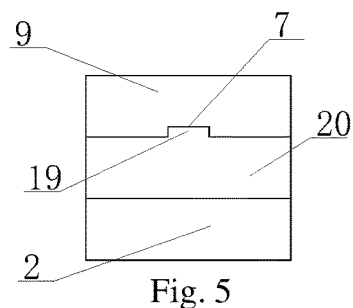
FIG. 5 is a partial schematic diagram of assembling of a first outer boss, a second outer boss and a first inner flange in variant 1 of Embodiment 2.

Variant 1:

As shown in FIG. 5, a first groove 17 is provided on the lower surface of the second outer bosses 9, and a third rib 19 matched with the first groove 17 is provided on the upper surface of the first inner flange 20; or, the first inner flange 20 and the second outer boss 9 may also be positioned circumferentially. Similarly, a first groove is provided on the upper surface of the first outer boss 2, and a third rib 19 matched with the first groove is provided on the lower surface of the first inner flange 20.

Figure 6:
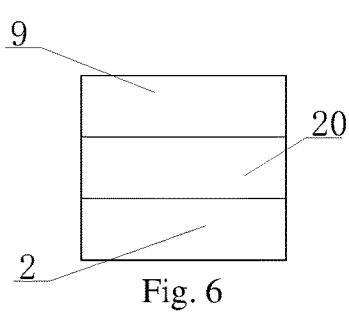
FIG. 6 is a partial schematic diagram of assembling of the first outer boss, the second outer boss and the first inner flange in variant 2 of Embodiment 2.

Variant 2:

As shown in FIG. 6, bumps or recesses are not provided on both the first outer boss 2 and the second outer boss 9. In this case, the basic axial positioning function may be realized, but the ability to resist circumferential rotation is poor, and the fastener still may become loose after connected to a splicing piece.

Figure 7:
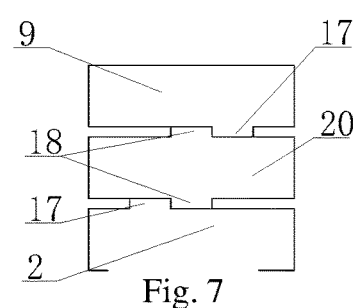
FIG. 7 is a partial schematic diagram of assembling of the first outer boss, the second outer boss and the first inner flange in variant 3 of Embodiment 2.

Variant 3:

As shown in FIG. 7, first ribs 17 are provided on the upper surface of the first outer boss 2 and the lower surface of the second outer boss 9 in a sample pair of oppositely arranged outer bosses; second ribs 18 are provided on both the upper surface and the lower surface of the first inner flange 20, and the second ribs 18 have a same circumferential position on the same first inner flange 20; and, the two first ribs 17 on the same pair of outer bosses are located on two sides of the upper and lower second ribs 18. By taking rotating the first inner flange 20 to the left side of FIG. 7 as example, when the first inner flange 20 is rotated relative to the first and second outer bosses 9, the upper second rib 18 passes over the first rib 17 on the lower surface of the second outer boss, while the lower second rib 18 encounters the first rib 17 on the upper surface of the first outer boss 2, and cannot pass over the first rim 17 located below if a torque is not applied continuously. Therefore, the first outer boss 2 may be circumferentially positioned by such a structure. The axial positioning may be realized by the upper and lower surfaces of the second ribs 18 and the coordination of the opposite surfaces of the first and second outer bosses 9.

With such a structure, since the first inner flange 20 and the outer bosses are rotated relatively, it is only required to overcome the friction generated when the second rib 18 comes into contact with the first rib 17, and the friction area is reduced greatly, so that the time required for applying a larger force to maintain rotation and it is convenient for assembly. Of course, since the reduction of the contact material may quicken the wear speed of the first and second ribs 18, this variant solution may be suitable for a case where less assembling times are required.

Figure 8:
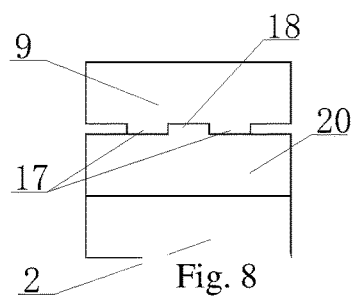
FIG. 8 is a partial schematic diagram of assembling of the first outer boss, the second outer boss and the first inner flange in variant 4 of Embodiment 2.

Variant 4:

As shown in FIG. 8, slightly different from the variant 3, a pair of first ribs 17 is provided on the first outer boss 2, a second rib 18 is provided on the lower surface of the first inner flange 20, and the second rib 18 is located between the pair of first ribs 17 when a splicing piece is in snap-in connection to a fastener. By taking the first inner flange 20 being rotated to the left side of FIG. 8 as example, when the first inner flange 20 is rotated relative to the first and second outer bosses 17, the upper second rib 18 first passes over the first rib 17 on the lower surface of the second outer boss, while the other first rib 17 is occluded. If a torque is not applied continuously, the other first rib 17 cannot be passed over. Therefore, such a structure may be used to circumferentially position the first outer boss 2. The axial positioning may be realized by contacting the upper surface of the second rib 18 with the upper surface of the first outer boss 2 and contacting the upper surface of the first inner flange 20 with the lower surface of the second outer boss 9.

Of course, the two first ribs 17 in this variant 4 may also be provided on the lower surface of the second outer boss, and the second rib 18 is changed correspondingly.

Figure 9:
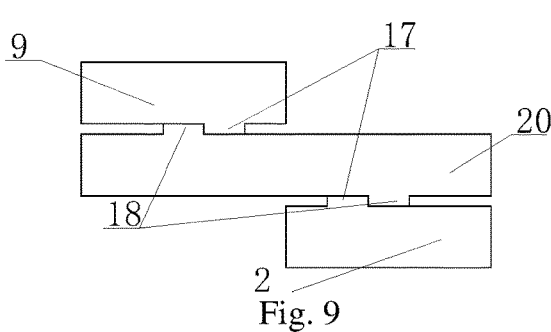
FIG. 9 is a partial schematic diagram of assembling of the first outer boss, the second outer boss and the first inner flange in variant 5 of Embodiment 2.
Figure 10:
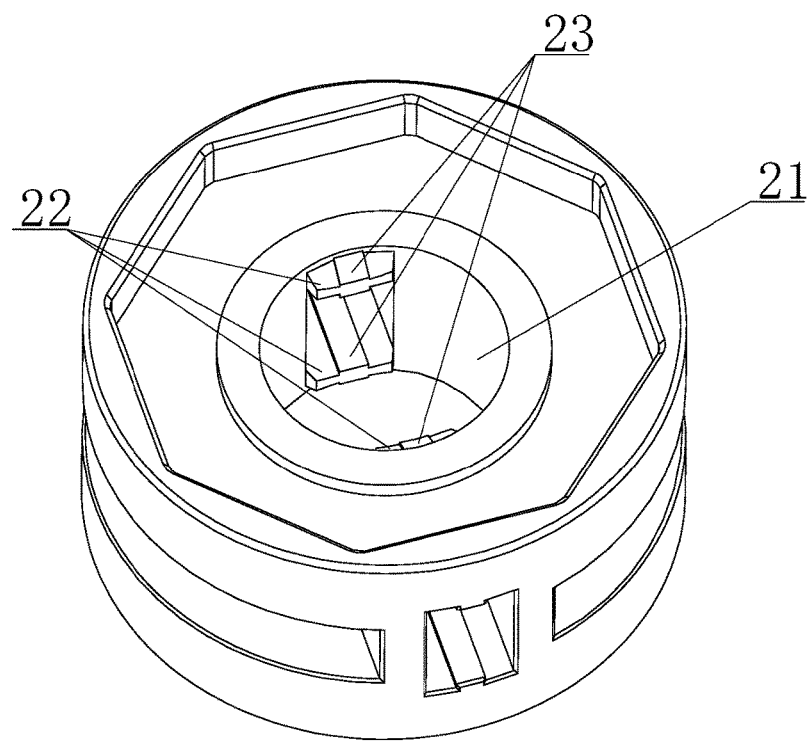
FIG. 10 is a stereoscopic diagram of a fastener connecting member in Embodiment 3, when viewed from the inclined top.

Variant 5:

As shown in FIG. 9, slightly different from the variant 3, by taking two pairs of outer bosses as example, the first outer boss 2 and the second outer boss 9 in each pair of outer bosses are provided at different circumferential positions; a first rib 17 is provided on the upper surface of the first outer boss 2; a first rib 17 is provided on the lower surface of the second outer boss 9; second ribs 18 are provided on both the upper surface and the lower surface of the first inner flange 20; and, the two second ribs 18 are located at different circumferential positions of the first inner flange 20. When a splicing piece is snapped onto a fastener, a first rib 17 is provided on one side of the second rib 18 on the upper or lower surface of each of the first inner flange 20 to limit the second rib 18 to the circumferential position, so that it is ensured that the slicing piece and the fastener will not relatively rotate in the circumferential direction of the first inner flange 20. Although it may be seen from FIG. 9 that the first ribs 17 and the first and second outer bosses 9 cannot limit the rotation of the first inner flange 20 in the shown counterclockwise direction, since the combination of the first rib 17, the first outer boss 2 and the second outer boss 9 on the left side of FIG. 9 is actually located on the opposite side of a paper surface and the distribution direction is opposite to the direction shown in FIG. 9, the rotation of the first inner flange relative to the post in the shown counterclockwise direction may be limited. Hence, the circumferential positioning function is realized, and the degree of freedom in the axial direction perpendicular to the paper surface is also limited.

In conclusion, various positioning structures may be designed by those skilled in the art under the teaching of the present application and in combination with the factors "whether there are bumps and recesses for coordination to realize the circumferential positioning", "whether the first outer bosses and the second outer bosses are overlapped at positions in the circumferential direction of the post", "whether the first bump/first recess is provided on a single surface or both surfaces of the first inner flange" and "the coordination with the bump of the first inner flange is realized by a recess or a bump", and these positioning structures shall fall into the protection scope of the present application and will not be repeated one by one.

Embodiment 3

New reference signs have the following meanings: 21: third through hole; 22: third inner flange; and, 23: fifth rib.

A fastener connecting member suited with the fastener has a third through hole, two layers of third inner flanges 22 are provided on the inner wall of the third through hole 21 at different heights. Two pairs of third inner flanges 222 are provided at different circumferential positions. There are total fourth third inner flanges 220 used for being clamped by adjacent outer bosses of the fastener, for example, being clamped by the third outer boss 15 and the second outer boss 9. Each layer of the third inner flanges 22 is matched with the outer bosses of the fastener for clamping the fastener connecting member.

By providing a plurality of third inner flanges 22, different inner flanges may be coordinated with outer bosses of different fasteners to connect a plurality of fasteners together. Thus, the length of the fasteners is increased in disguise, and more splicing pieces are connected at a same position.

Preferably, at least one of the upper surface and the lower surface of each of the third inner flanges 22 is a slope which forms an acute angle with the axis of the post; the upper surface and the lower surface of each of the third inner flanges 22 form a wedge in a plane of the axis of the post; and, the third inner flanges 22 are coordinated with adjacent outer bosses to realize the radial positioning of the fastener connecting member and the fastener.

By making the cross-section of each of the third inner flanges 22 as a wedge, the third inner flanges 22 may be coordinated with the outer bosses to realize the self-centering of the first through hole and the post. Thus, the coaxiality of a plurality of fasteners connected to a same fastener connecting member is ensured, the coaxiality of the first through holes and the second through holes of a plurality of splicing pieces at this position is improved, and the smooth operation of a robot is ensured.

Preferably, fifth ribs 23 matched with the first grooves 7 are provided on the third inner flanges 22.

By providing fifth ribs 23 on the third inner flanges 22, the circumferential position of the third outer boss 15 relative to the third inner flanges 22 may be limited, so that the disengagement of two connected fasteners caused by the relative rotation of the third inner boss 15 and the third inner flanges 22 due to variation, loosing or other reasons is avoided, and the reliability of connection is improved.

As shown FIGS. 13 and 14, FIG. 13 shows a case of two fasteners and a same fastener connecting member. The two fasteners are in snap-in connection to one layer of the third inner flanges 22 of the fastener connecting member by respective third inner outer bosses 15 and second outer bosses 9.

Embodiment 4

New reference signs have the following meanings: 31: first through hole; 32: second through hole; 33; motor output sleeve; and, 34: axial rib.

A splicing piece suited with the fastener is provided, wherein at least a local portion of the splicing piece is a platy portion; connecting through holes are provided in the platy portion, and the connecting through holes include a first through hole; and, a first inner flange used for being clamped by the lower surface of the first outer boss and the upper surface of the second outer boss is provided on the inner wall of the first through hole.

By providing the first inner flange 20 in the through hole of the splicing piece, the first and second outer bosses in the upper portion of the post may be clamped, and the relative axial position of one splicing piece and the fastener may be limited. Moreover, the axial positions of other connected splicing pieces may also be limited by this splicing piece and in conjunction with the outer slab. Thus, the axial positions of a plurality of splicing pieces on the fastener may be limited without other locking components or fasteners connected on the top of the fastener. As a result, the number of pieces to be mounted during connection is reduced, and the assembly efficiency of robots is improved.

Preferably, at least one of the upper surface and the lower surface of the first inner flange is a slope which forms an acute angle with the axis of the post, the upper surface and the lower surface of the first inner flange form a wedge in a plane of the axis of the post, and the first inner flange is coordinated with the first outer boss and the second outer boss to realize the radial positioning of the splicing piece and the fastener.

By making the cross-section of the first inner flange be a wedge, the first inner flange may be coordinated with the first and second outer bosses to realize the self-centering of the first through hole and the post, so that the positioning accuracy of the connection of the splicing piece and the fastener is ensured.

Preferably, a second recess or a second bump matched with the first bump or a third bump matched with the first recess is provided on the first inner flange.

By providing a recess and/or a bump on the first inner flange, the circumferential positions of the first and second outer bosses relative to the first inner flange may be limited. Consequently, the disengagement of two connected fasteners caused by the relative rotation of the first outer boss and the first inner flange due to the vibration, loosing or other reasons is avoided, and the reliability of connection is improved.

Preferably, the connecting through holes further include a second through hole which is an unthreaded hole. An upper positioning flange is provided on the upper surface of the outer slab of the fastener. The upper positioning flange is used for realizing positioning of the fastener and a lower one among a plurality of splicing pieces sheathed on the post, and the positioning realizes the coordination by the outer wall of the upper positioning flange and the inner wall of the second through holes of the lower splicing piece.

By positioning the upper positioning flange and the second through hole, it is ensured that the relative position of the fastener and the lower one among the plurality of splicing pieces is stable, and the shaking of the fastener on the splicing piece is avoided by the coordination with the upper surface of the outer slab.

Preferably, the splicing member is a bar member, the connecting through holes are distributed on a center line of the bar member, and a side bump protruded from a side wall body is further provided on a side wall of the bar member on an outer side of the second through hole.

When a plurality of bar members are overlaid together, by side bumps on the side walls of the bar members, holes in the side bumps may be distinguished as first through holes or second through holes. As a result, the discrimination degree of geometric elements in a plurality of pieces mounted together is improved, and it is convenient for allowing a corresponding shaft or other pieces to pass therethrough.

Only several splicing pieces are listed below, and are not intended to limit the forms of the splicing pieces.

Figure 15:
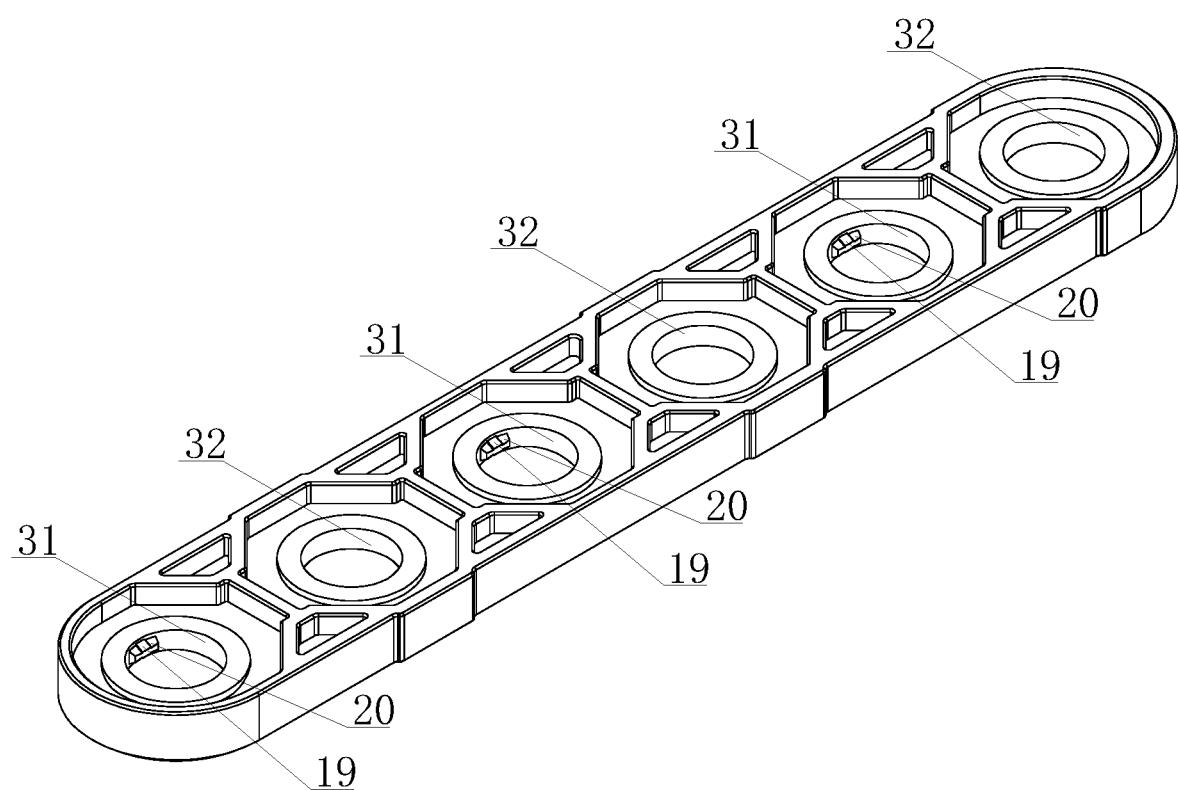
FIG. 15 is a stereoscopic diagram of a bar member with six holes in Embodiment 4.

1. As shown in FIG. 15, a six-hole bar member is shown. There are six through holes on the bar member. Three first through holes 31 and three second through holes 32 are arranged at intervals. A side bump protruded from a side wall body is further provided on a side wall of the bar member on an outer side of the second through holes 32, so as to distinguish that the through holes on the bar member are first through holes 31 or second through holes 32 when a plurality of bar members are overlaid. In the first through holes 31 of the bar member, both the upper and lower surfaces of the first inner flange 20 are slopes, and third ribs 19 are provided on the upper and lower surfaces.

Figure 16:
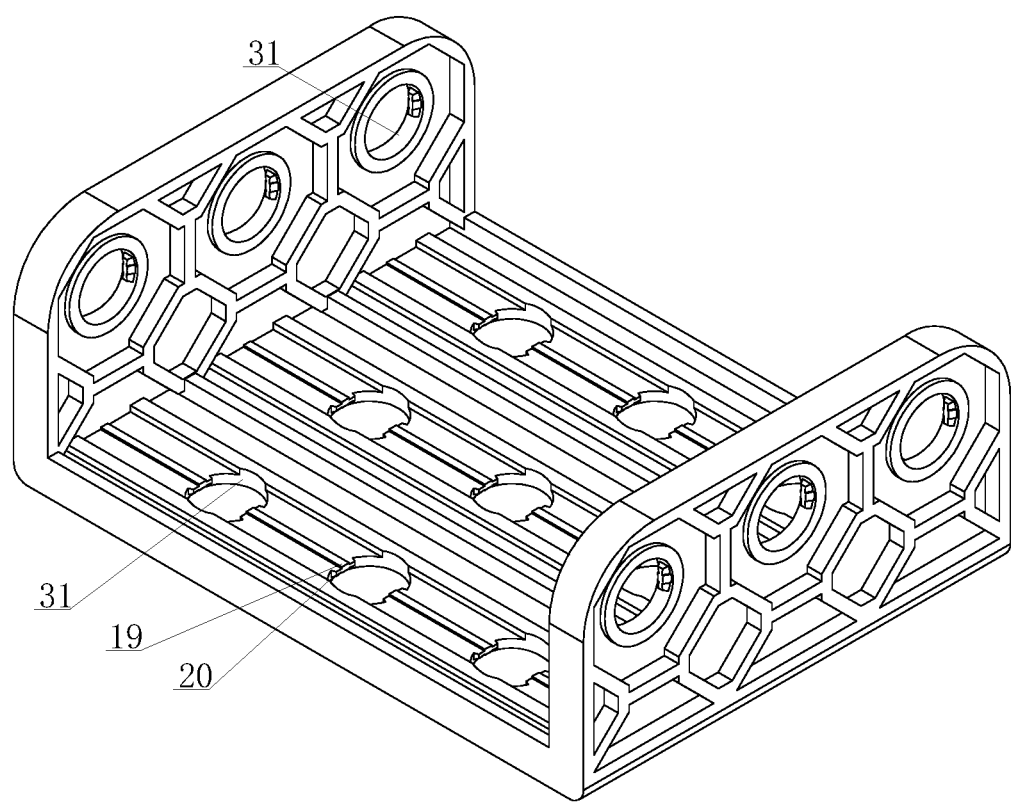
FIG. 16 is a stereoscopic diagram of a bent plate member in Embodiment 4.

2. As shown in FIG. 16, a bent bar member is shown, including a slab and vertical plates on two sides of the slab. Holes on the vertical plates are first through holes 31. The surfaces of first inner flanges 20 of the first through holes 31 in contact with the outer bosses are slopes. For the first through holes 31 on the slab, the upper surfaces of the first inner flanges 20 cannot be manufactured into slopes and are planes, and the lower surfaces of the first inner flanges 20 may be slopes. Third ribs 19 are provided on both the upper surfaces and lower surfaces of the first inner flanges 20.

Figure 17:
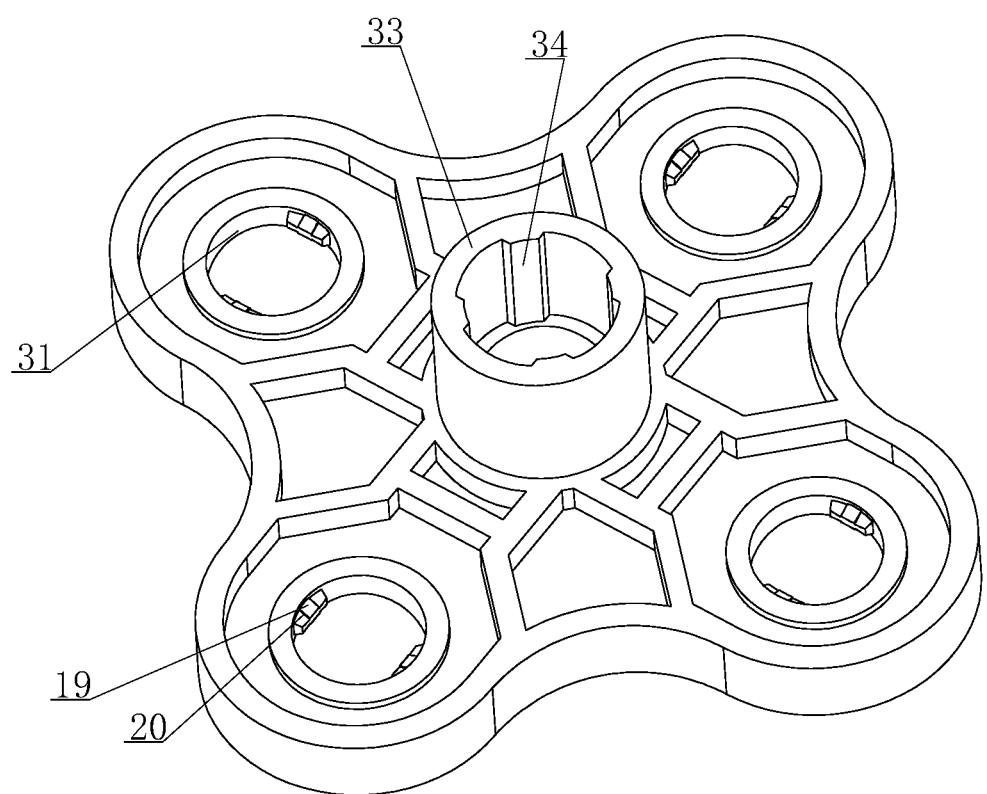
FIG. 17 is a stereoscopic diagram of a motor output flange in Embodiment 4.

3. As shown in FIG. 17, a motor output flange is shown, including a slab portion and a motor output sleeve 33 provided in a center of the slab portion. A plurality of axial ribs 34 are provided on the inner wall of the motor output sleeve 33, and the plurality of axial ribs 34 may realize spline fitting with an output shaft of a motor. In the slab portion of the motor output flange, a plurality of first through holes 31 are uniformly distributed by using the axis of the motor outer sleeve 33 as a center, and upper and lower surfaces of the first inner flanges 20 in the first through holes are slopes and provided with third ribs 19.

Embodiment 5

The new reference sign has the following meaning: 41: eighth rib.

An assembled component is provided, including the fastener and the splicing piece.

When the splicing piece and the fastener are used, the splicing piece may be directly connected to the fastener and axially positioned, without mounting other pieces, so that the assembly efficiency of robots is improved.

Figure 18:
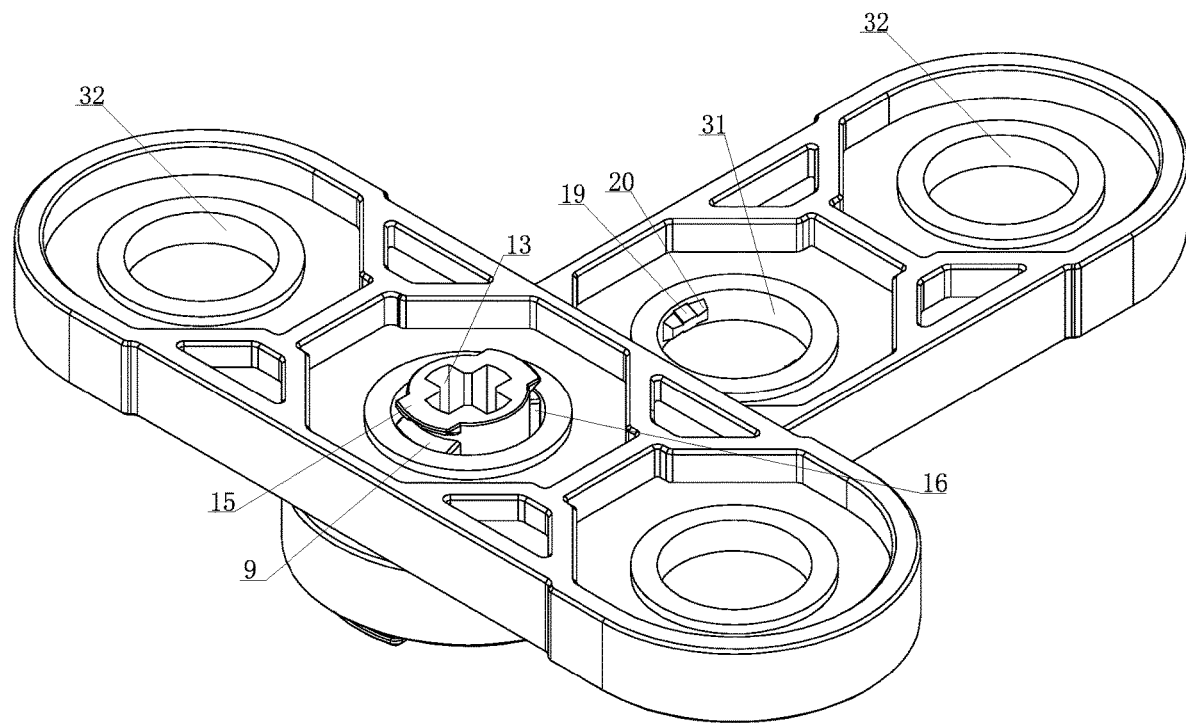
FIG. 18 is a stereoscopic diagram of connecting a fastener with a bar member in Embodiment 5.
Figure 19:
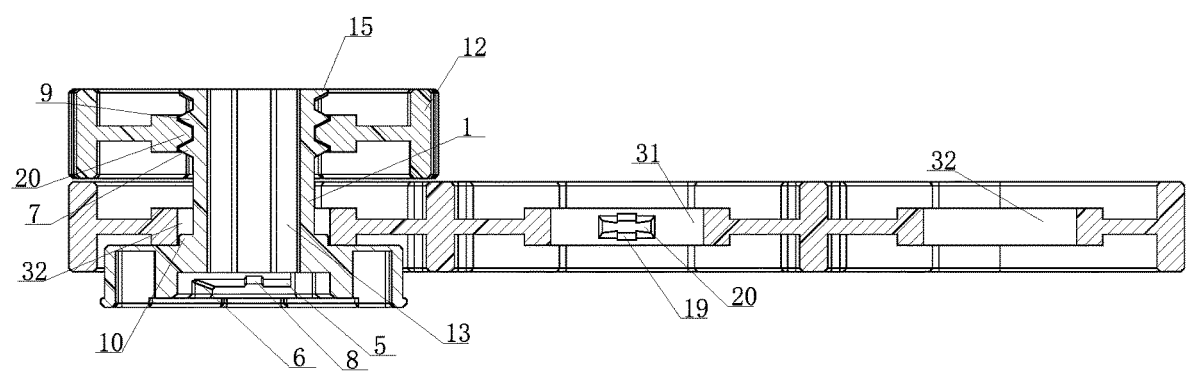
FIG. 19 is a sectional view of FIG. 18.

FIGS. 18 and 19 show a case where a fastener is jointed to splicing pieces, where each of the two connected splicing pieces is a three-hole bar member, with a hole in the middle of the three-hole bar member being a first through hole 31 and holes at two ends being second through holes 32. In the drawings, the fastener passes through the first through hole 31 of the upper three-hole bar member and the second through holes 32 of the lower splicing piece. The first inner flange of the upper splicing piece is clamped by the first outer boss 5 and the second outer boss 9, and the third rib is matched with the first groove 7 on the upper surface of the first outer boss 5 and the first groove 7 on the lower surface of the second outer boss 9, so it is unable to do relative rotation; however, the second through holes 32 of the lower splicing piece and the upper positioning flange 10 are positioned radially, it is thus able to do relative rotation.

The drawings show a case where three-hole bar members are connected to the fastener. Actually, a case where bar member with other number of holes or other bent plates or motor output flange pieces are connected to a fastener may also refer to this embodiment.

Figure 20:
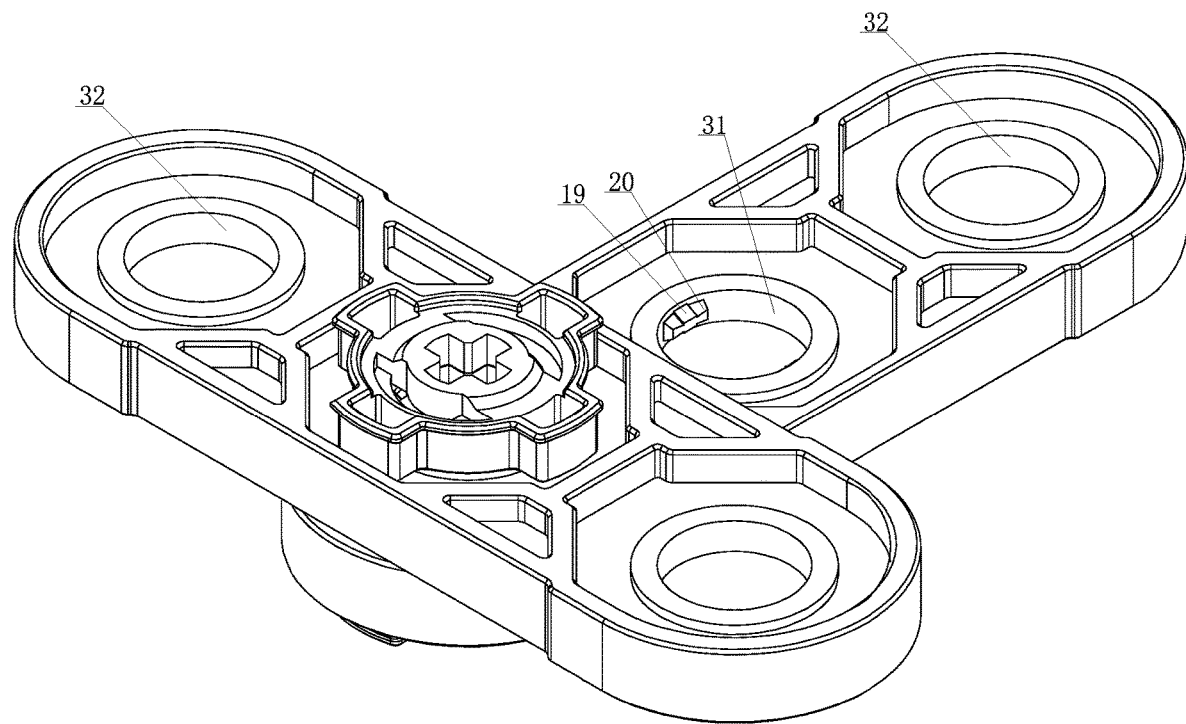
FIG. 20 is a stereoscopic diagram of connecting bar members together by a fastener and a connecting cap in Embodiment 5.
Figure 21:
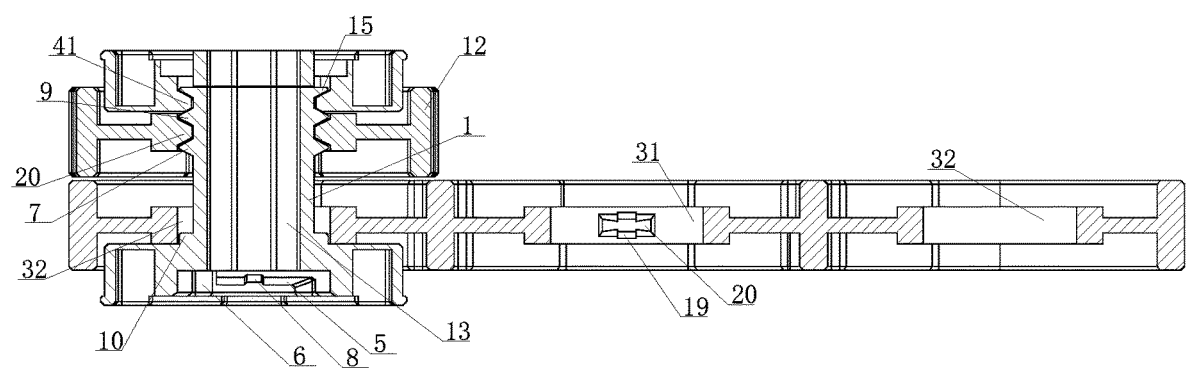
FIG. 21 is a sectional view of FIG. 20.

FIGS. 20 and 21 show a case where bar members are connected together by a fastener and a connecting cap. A connecting cap is further mounted on the top of the fastener. The connecting cap in this embodiment refers to the connecting cap in Embodiment 8, and has a smaller thickness than that of the connecting cap in Embodiment 8. Further, the fastener has no upper and lower positioning flanges on the bottom of the fastener shown in Embodiment 8. The eighth rib 41 of the inner flange of the connecting cap is coordinated with the groove on the lower surface of the third boss 15, so that the relative rotation of the connecting cap and the fastener may be avoided.

Figure 22:
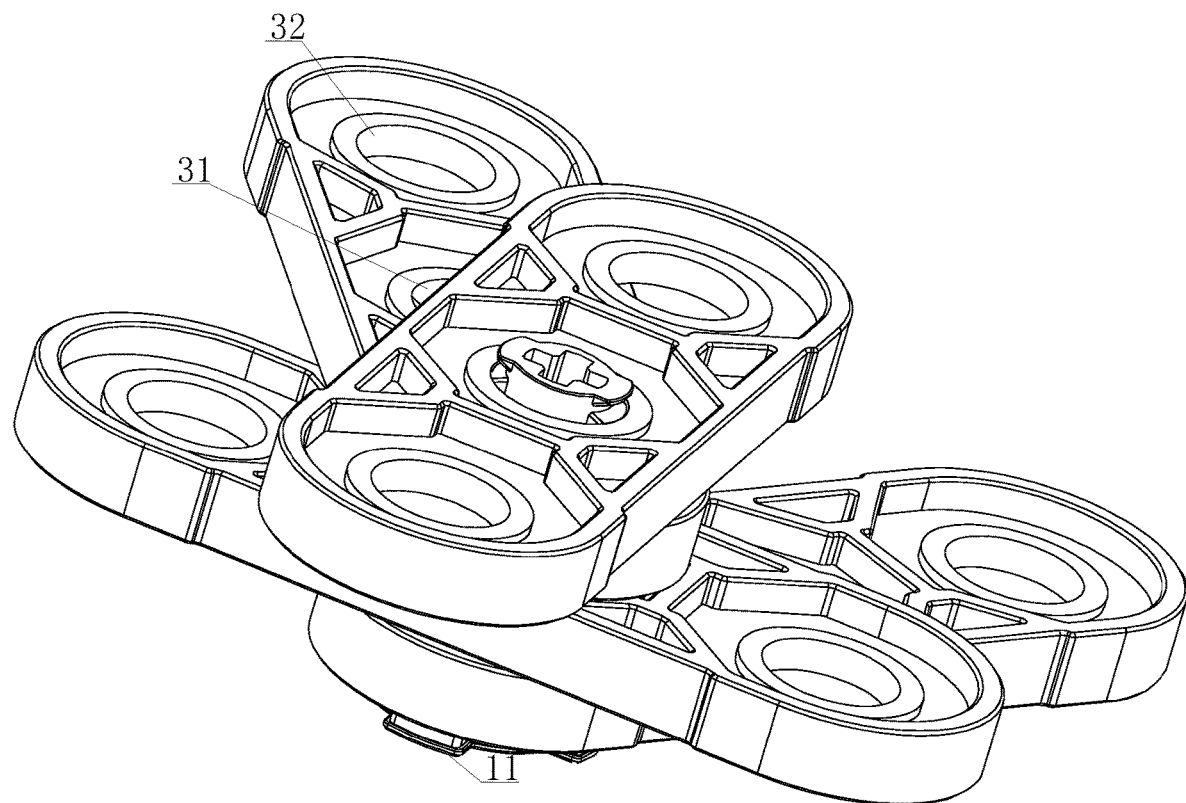
FIG. 22 is a stereoscopic diagram of connecting bar members in four layers together by two fasteners in Embodiment 5.
Figure 23:
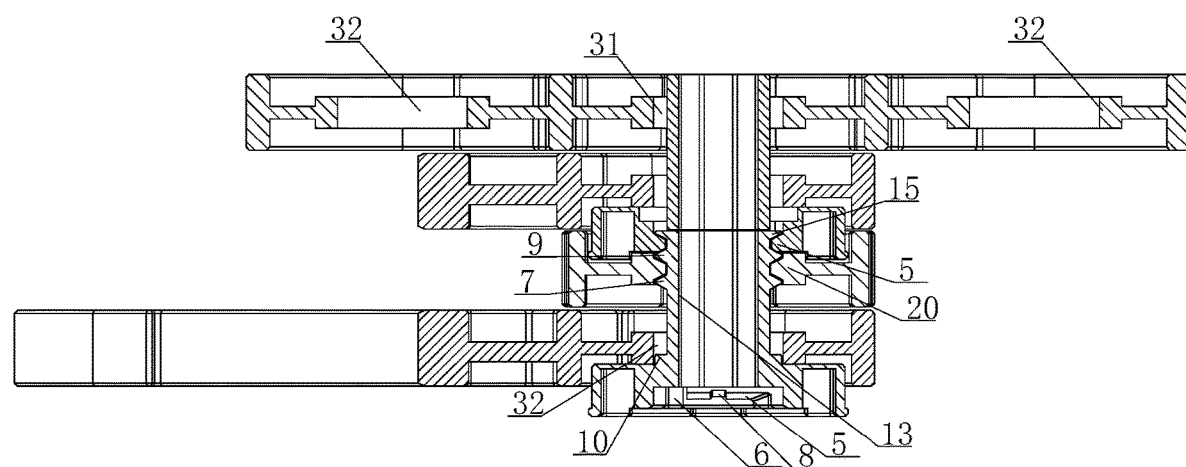
FIG. 23 is a sectional view of FIG. 22 in a length direction of the bar member in the fourth layer.
Figure 24:
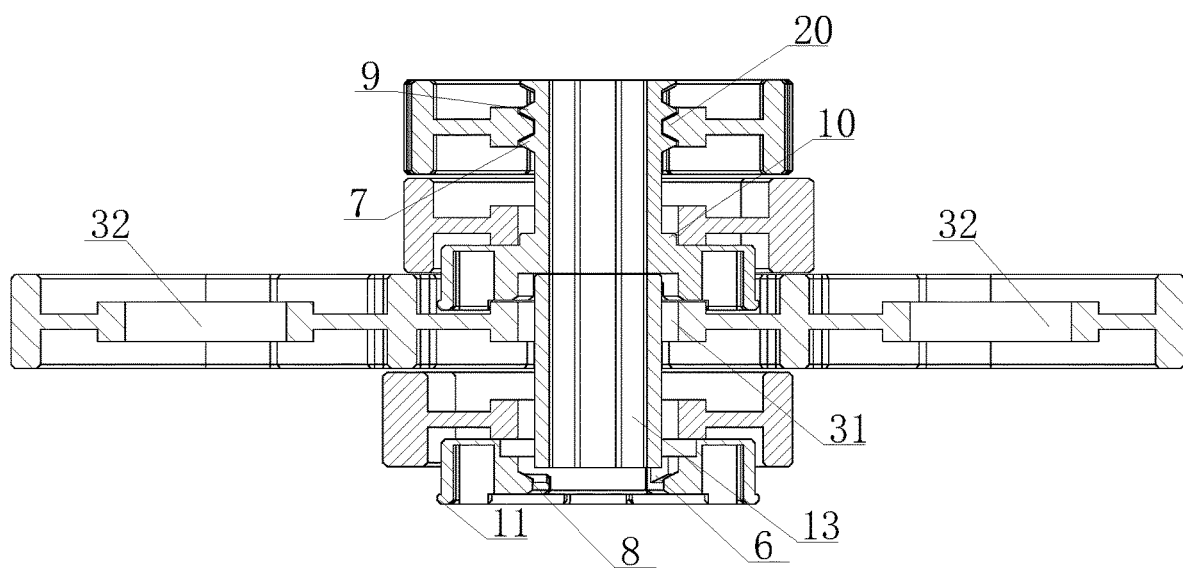
FIG. 24 is a sectional view of FIG. 22 in a length direction of the bar member in the second layer.

FIGS. 22-24 show a case where four bar members are connected together by two fasteners, where the four bar members are defined as first to fourth bar members from up to down. The lower fastener is in snap-in connection to the first through hole 31 of the second bar member, and the first inner flange 20 of the first through hole 31 of the fourth bar member is in snap-in connection to the first and outer bosses 9 of the upper fastener. Since there is an angle of 90° between the six ribs and the first outer bosses in the fasteners, the two fasteners are staggered at 90° after the six rib 8 of the upper fastener is matched with the groove of the third outer boss 15. Therefore, the second bar member in snap-in connection to the lower fastener and the fourth bar member in snap-in connection to the upper fastener are also staggered at 90°. Since the second through holes 32 of the first bar member are sheathed on the lower portion of the lower fastener, the first bar member may rotate relative to the lower fastener; similarly, the third bar member may also rotate relative to the upper fastener.

Embodiment 6

A difference between this embodiment and Embodiment 6 lies in that a fastener connecting member is further included.

Figure 25:
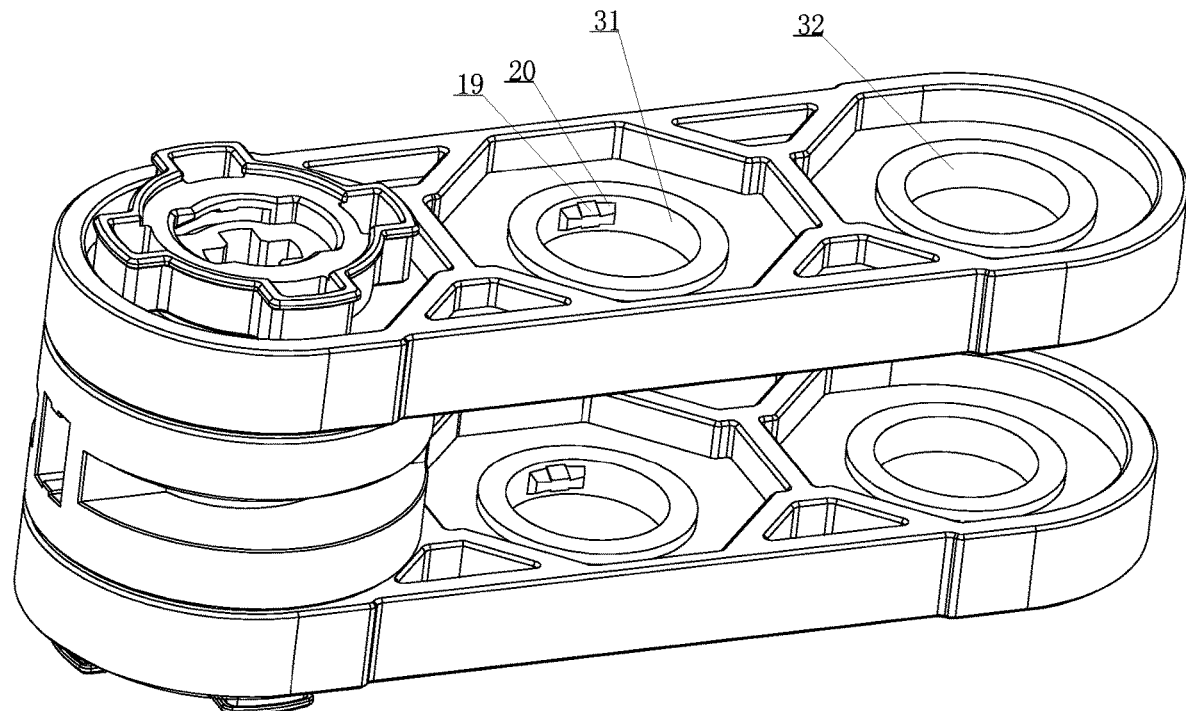
FIG. 25 is a stereoscopic diagram of connecting bar members together by a fastener and a fastener connecting member in Embodiment 7.
Figure 26:
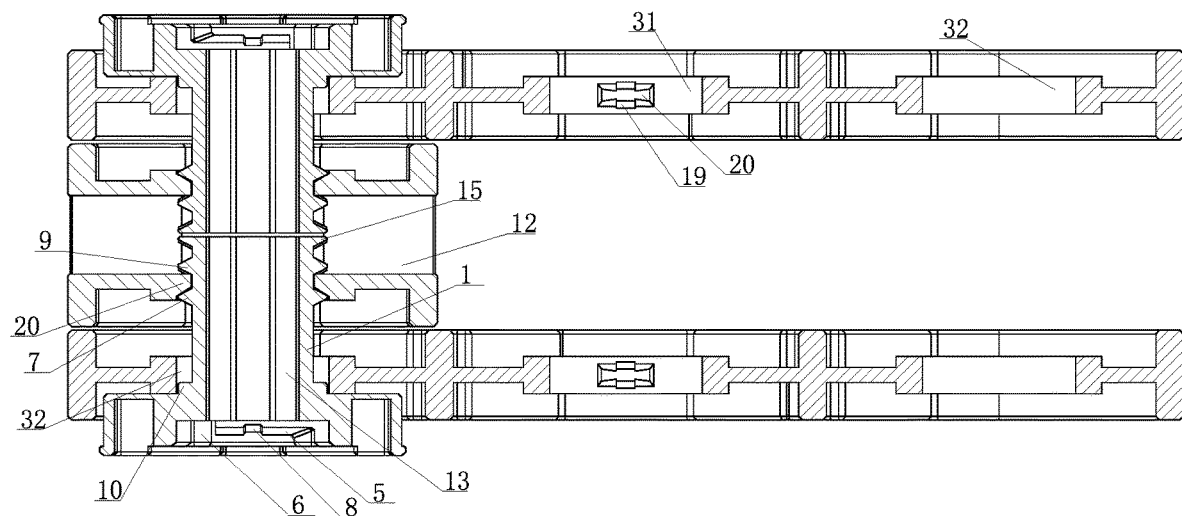
FIG. 26 is a sectional view of FIG. 25.
Figure 27:
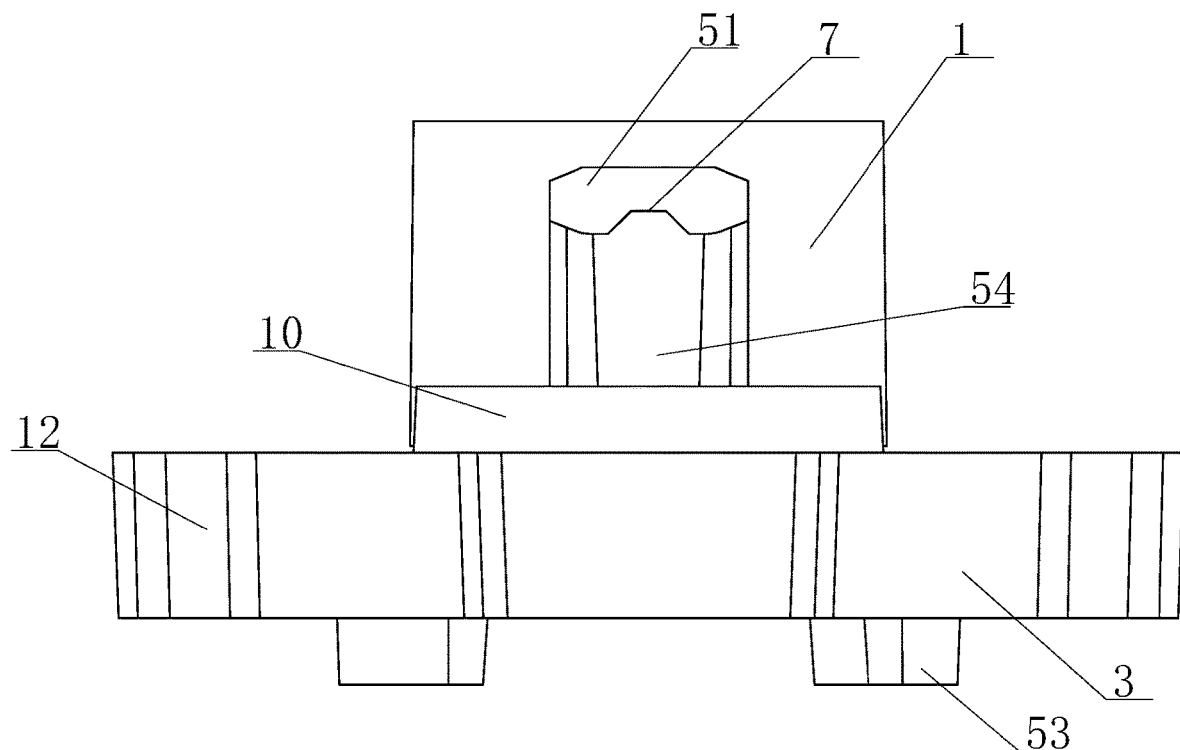
FIG. 27 is a front view of the fastener in Embodiment 7.
Figure 28:
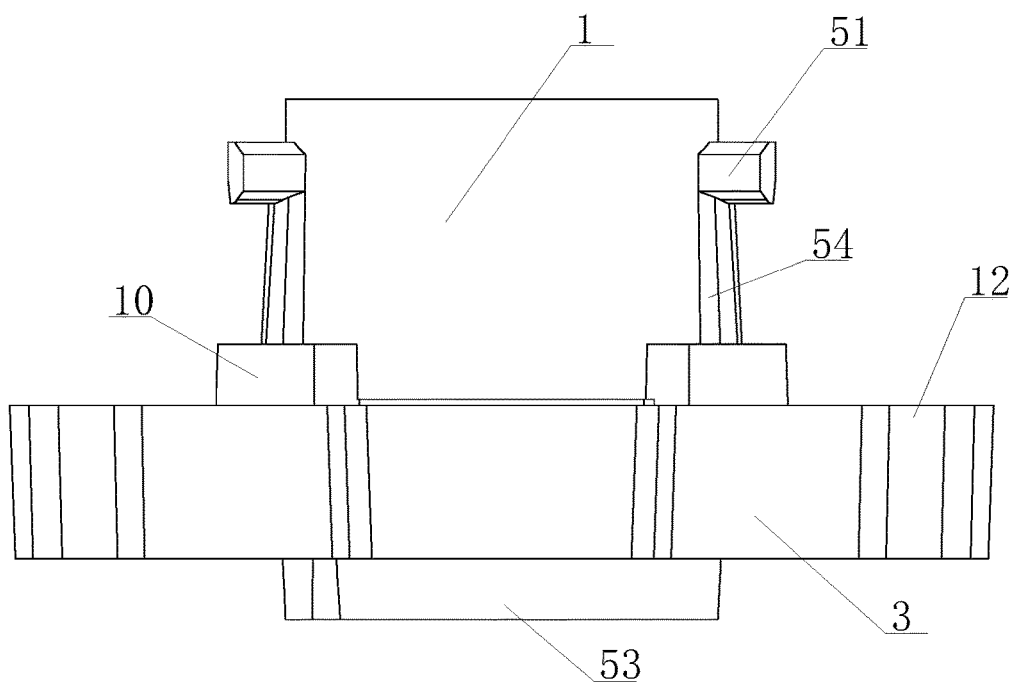
FIG. 28 is a side view of the fastener in Embodiment 7.
Figure 29:
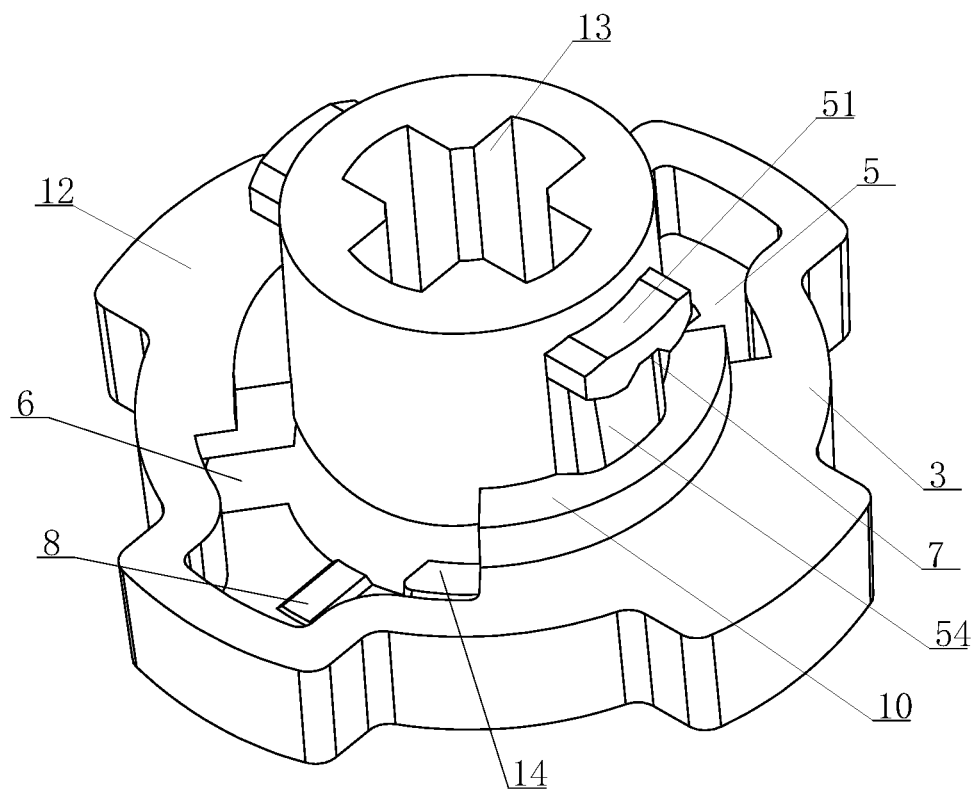
FIG. 29 is a stereoscopic diagram of the fastener in Embodiment 7, when viewed from the inclined top.
Figure 30:
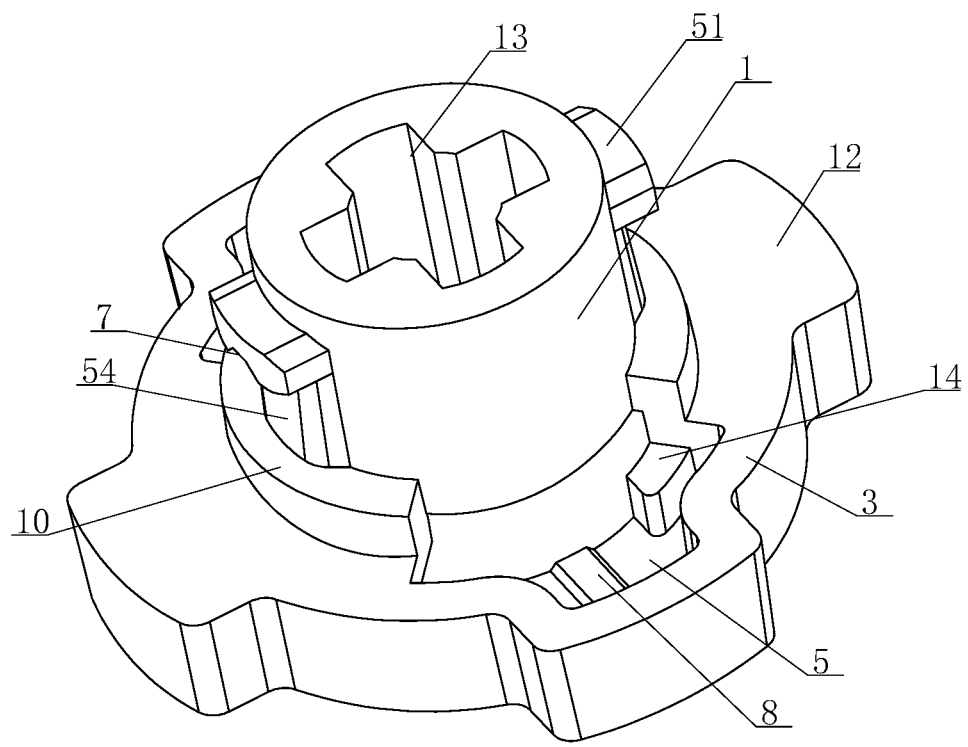
FIG. 30 is a stereoscopic diagram of the fastener in Embodiment 7, when viewed from another angle of the inclined top.
Figure 31:
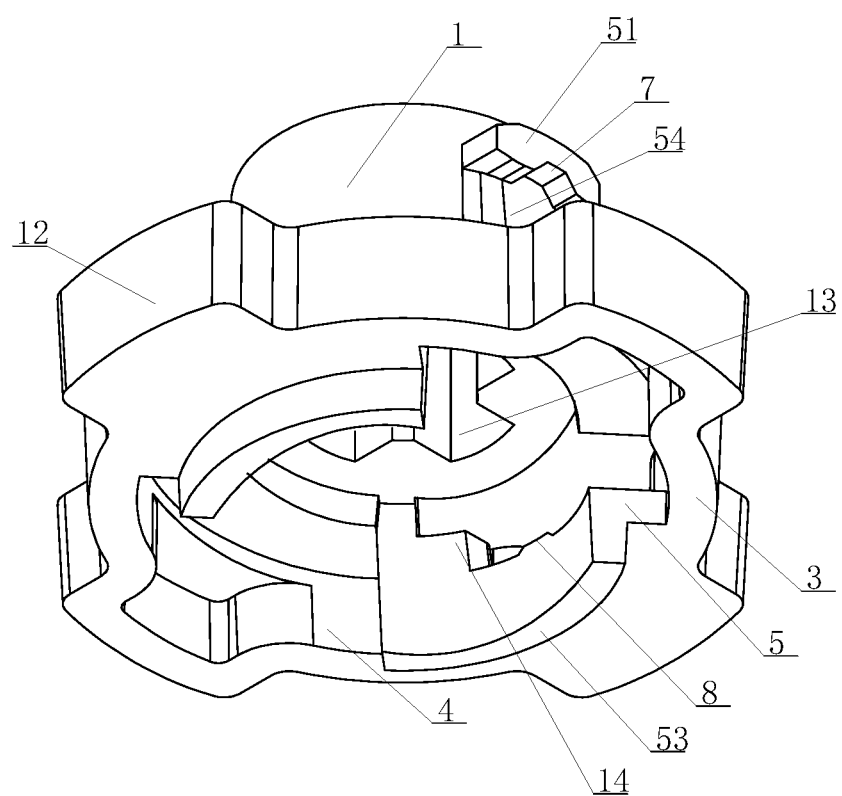
FIG. 31 is a stereoscopic diagram of the fastener in Embodiment 7, when viewed from the inclined bottom.
Figure 32:
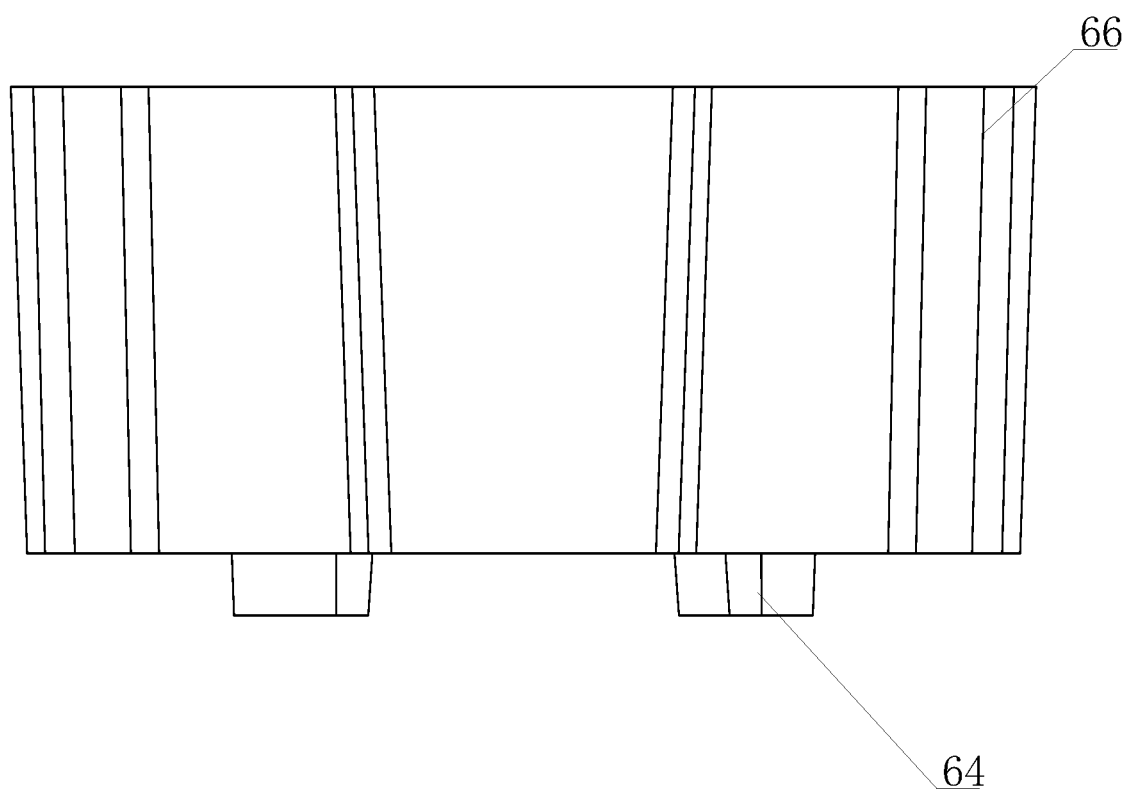
FIG. 32 is a side view of a connecting cap in Embodiment 8.
Figure 33:
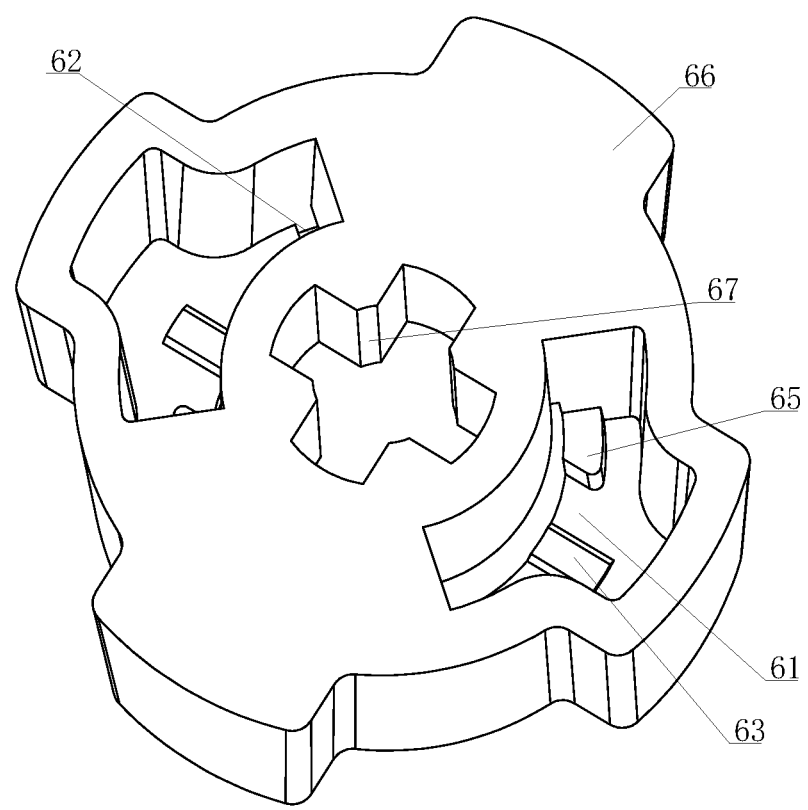
FIG. 33 is a stereoscopic diagram of the connecting cap in Embodiment 8, when viewed from the inclined top.
Figure 34:
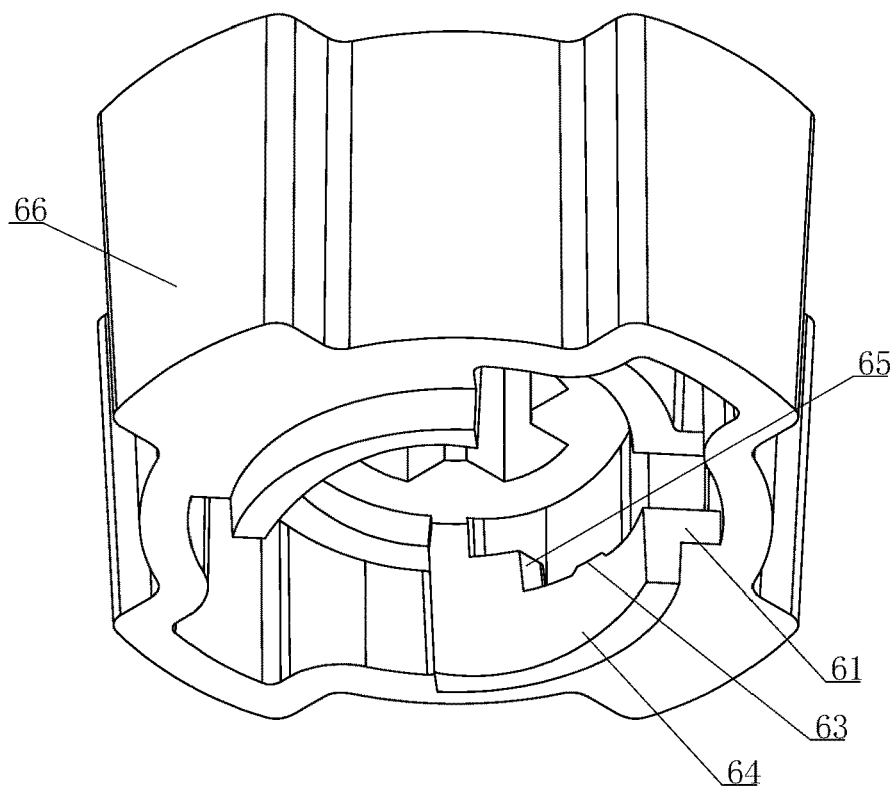
FIG. 34 is a stereoscopic diagram of the connecting cap in Embodiment 8, when viewed from the inclined top.

FIGS. 25 and 26 show a case where two bar members are connected together by a fastener and a fastener connecting member. The two bar members are mounted in a lower portion of the post 1 of the lower fastener and in an upper portion of the post 1 of the upper fastener through second through holes. Each fastener is clamped by the first outer boss 5, the second outer boss 9 and the third inner flange 22 of the fastener connecting member. The two fasteners are unable to do relative rotation when disassembly/assembly is not performed. Since each bar member is mounted at a position on the post without an outer boss and sheathed on the fastener through the second through holes 32, each bar member may rotate relative to the combination of the fasteners.

Embodiment 7

New reference signs have the following meanings: 51: fifth outer boss; 55: ninth groove; 53: first lower positioning flange; and, 54: positioning rib.

A fastener is provided, including a post 1, wherein fifth outer bosses 51 are provided in an upper portion of the post 1, and an outer slab 3 perpendicular to the post 1 is provided in a lower portion of the post 1. A first hole 4 is provided within a local region of the outer slab 3 below the post 1, and a second inner flange 5 is provided on an inner wall of the first hole 4. The second inner flange 5 has a first gap 6 greater than the width of the fifth outer bosses 51. The upper surface of the second inner flange 5 is used for abutting to the lower surfaces of the fifth outer bosses 51 of the lower fastener when limiting the position of the connected piece in the height direction of the post 1. In this embodiment, two sections of the second inner flange 5 and two sections of the first gap 6 are provided on the inner wall of the first through in a staggered manner. Each section of the second inner flange 5 and each section of the first gap 6 are equivalent to ¼ of the circumference of the inner wall at this height.

When two fasteners are connected together, the post 1 of the lower fastener extends into a hole of the upper fastener, and the second inner flange 5 of the upper fastener is fastened by the fifth outer bosses 51, so that the axial positions of two connected pieces are limited and the connection of the two connected pieces is realized. Moreover, since the outer slab 3 allows the enveloped shape of the connected components to be conical as a whole and the outer bosses will become factors for hindering the rolling of fasteners, the fasteners will not roll for a long distance, and the problem of the missing of screws is avoided during the use of screws. More crucially, the disassembly/assembly of screws is realized without tools which are possibly dangerous for children, such as screwdrivers, and the use safety of connecting members for robot pieces is greatly improved, so that it is advantageous for the popularization of robots in teenagers.

Specifically, there are two fifth outer bosses 51. The fifth outer bosses 51 may extend outward in the radial direction of the post 1. Ninth grooves 55 are provided on the lower surfaces of the fifth outer bosses 51, and sixth ribs 8 used for matching with the ninth grooves of 55 of the lower fastener are provided on the upper surface of the second inner flange 5. Particularly, chamfers are further provided on two side edges of the lower surface of each of the fifth outer bosses 51, which are parallel to or substantially parallel to the radial direction of the post. The chamfers may reduce the resistance when the edges of the lower surface of each of the fifth outer bosses 51 move on the six ribs 8, so that it is convenient for users to realize positioning of the ninth grooves 55 and the sixth ribs 8.

By providing ninth grooves 55 on the lower surfaces of the fifth outer bosses 51 and providing sixth ribs 8 matched with the ninth grooves on the upper surface of the second inner flange 5, the circumferential positions of the fifth outer bosses 51 relative to the second inner flange 5 may be limited. Consequently, the disengagement of two connected fasteners caused by the relative rotation of the fifth outer bosses 51 and the second inner flange 5 due to the vibration, loosing or other reasons is avoided. As a result, the reliability of connection is improved.

Specifically, a first lower positioning flange 53 is provided on the lower surface of the outer slab 3, the first lower positioning flange is used for realizing positioning of the upper fastener and a connected piece located above when two fasteners are connected to each other to connect a plurality of connected pieces, and the positioning realizes the coordination by the outer wall of the first lower positioning flange 53 and the connecting through holes of the connected piece located above. To decrease the processing difficulty of the fasteners, the first lower positioning flange 53 may extend downward from the lower surface of the second inner flange 5.

By positioning the upper positioning flange 53 and the connected pieces, the position of the fastener relative to the lower one of the connected pieces is ensured to be stable, and the fastener is coordinated with the upper surface of the outer slab 3 to prevent the fastener from shaking on the connected piece.

Specifically, a positioning rib 11 is provided on an outer side of the post 1, and an outer surface of the positioning rib 11 coordinates with the inner surface of the first lower positioning flange 53 of an adjacent fastener when it is connected to the adjacent fastener.

By providing the positioning rib 11 matched with the inner surface of the first lower positioning flange 53, the positioning of the positioning rib 11 and the inner surface of the first lower positioning flange 53 is realized, and the relative positions of the upper and lower fasteners are ensured. Moreover, the positioning measures for the fasteners and connected pieces may reliably ensure the mutual positioning between the connected pieces.

Specifically, a first limiting block 14 used for limiting a relative rotation angle of the fifth outer bosses 51 relative to the second inner flange 5 is provided on the upper surface of the second inner flange 5. In this embodiment, the position of the first limiting block 14 is a position where a side face at the front end of the fifth outer bosses 51 in a rotation direction is located, when the ninth grooves 55 exactly move to the sixth ribs 8.

By providing a first limiting block 14 on the upper surface of the second inner flange 5, it may be avoided that the fifth outer bosses 51 escape from another first gap 6 of the flange due to excessive rotation amplitude of the fifth outer bosses 51 when two fasteners are connected together. Particularly, when a sixth rib 7 is provided on the upper surface of the second inner flange 5, a first limiting block 14 is provided besides the sixth rib 8, the fifth outer bosses 51 may be stopped in the rotation process of the second inner flange 5, and the stop position is a position where the ninth grooves 55 of the fifth outer bosses 15 are matched with the sixth ribs 8 of the second inner flange 5. Thus, during the rotation, it is avoided that the sixth ribs 8 are rotated out from the ninth grooves 55 again after being rotated into the ninth grooves, and the mounting efficiency is improved. Moreover, the arrangement of the first limiting block 14 may also prevent the unexpected disengagement of the sixth ribs and the ninth grooves 55 in a certain direction, and the reliability of connection is also improved.

Specifically, four first outer bumps 12 used for accepting and transferring, to the outer slab 3, a torque for allowing the fastener to rotate are further provided on an outside surface of the outer slab 3.

Specifically, a first transmission through hole 13 is formed in the middle of the post 1, and the first transmission through hole 13 is used for allowing a piece to pass through the first transmission through hole 13 to drive the fastener to rotate in a circumferentially relatively fixed manner. In this embodiment, the first transmission through hole 13 has a cross-shaped cross-section. Actually, the first transmission through hole 13 may also have an orthohexagonal, square or regularly triangular cross-section, to drive the fastener to rotate via a transmission piece.

By providing the first outer bumps 12, it is convenient for users to hold fasteners and apply an enough torque to connect two fasteners. Particularly, when the fifth outer bosses 51 and the second inner flange 5 are cooperatively connected by the ninth grooves 5s and the sixth ribs 8, a certain acting force is to be transferred to the sixth ribs 8 from the ninth grooves 55 to ensure the both to engage exactly. Specifically, by providing the first outer bumps 12, the contact length between the outer slab 3 and the connected pieces may be increased, and the connection between the fastener and the connected pieces may be more stable.

By providing the first transmission through hole 13, when a plurality of fasteners are connected together, a center bar may pass through the plurality of fasteners to drive the plurality of fasteners to rotate together. For example, during arranging a robot in form of a vehicle, wheels may be provided on two sides of the vehicle, and each wheel and an arm for mounting the wheel is mounted via the fastener. Then, a long bar passes through the fasteners on the two sides of the vehicle to realize the synchronous rotation of the wheels on the two sides. Meanwhile, the bar members or platy pieces connected by the fasteners are not influenced. Moreover, the flexibility of mechanical design is enhanced. This cannot be realized by the screw connection in the prior art. Moreover, by allowing non-circular pieces to pass through a plurality of fastener caps, a plurality of fasteners may be locked in the circumferential direction to avoid the relative relation between the fasteners and thus improve the reliability of connection, and the anti-rotation effects at ninth recesses and ninth bumps may be replaced in a certain sense.

Embodiment 8

New reference signs have the following meanings: 61: fourth inner flange; 62: second gap; 63: ninth rib; 64: second lower positioning flange; 65: second limiting block; 66: second outer bump; and, 67: second transmission through hole.

A connecting cap suited with the fastener is provided, wherein a second hole is formed in a lower portion of the connecting cap. A fourth inner flange 61 is provided on an inner wall of the second hole. The fourth inner flange 61 has a second gap 62 greater than the width of the fifth outer boss of the fastener. An upper surface of the fourth inner flange 61 is used for abutting to the lower surface of the fifth outer boss of the fastener below the connecting cap when limiting the position of the connected piece in the height direction of the post of the fastener.

Specifically, a ninth rib 63 matched with the ninth groove of the lower fastener is provided on the upper surface of the fourth inner flange 61.

Further, specifically, a second lower positioning flange 64 is provided on the lower surface of the fourth inner flange 61; the second lower positioning flange 64 is used for realizing positioning of the connecting cap and the connected piece located above when the connecting cap and the fastener are connected to connect a plurality of connected pieces; and, the positioning realizes the coordination by the outer wall of the second lower positioning flange 64 and the connecting through holes of the connected piece located above. To decrease the processing difficult of fasteners, the second lower positioning flange 64 may extend downward from the lower surface of the fourth inner flange 61, and the head end and tail end of the second lower positioning flange 64 in an arc direction are aligned to the head end and tail end of the fourth inner flange 61 in the arc direction.

Specifically, a second limiting block 65 used for limiting the relative rotation angle of the fifth outer boss relative to the fourth inner flange 61 is provided on the upper surface of the fourth inner flange 61.

Further, specifically, a plurality of second outer bumps 66 used for accepting and transferring, to the outer slab, a torque for allowing the connecting cap to rotate are further provided on an outside surface of the connecting cap.

Furthermore, specifically, a second transmission through hole 67 is formed in the middle of the connecting cap, and the second transmission through hole 67 is used for allowing a piece passing through the second transmission through hole 67 to drive the fastener and the connecting cap to rotate together in a circumferentially relatively fixed manner. In this embodiment, the second transmission through hole 67 has a cross-shaped section-section. Actually, the second transmission through hole 67 may also have an orthohexagonal, square or regularly triangular cross-section, to drive the fastener to rotate via a transmission piece.

When splicing pieces are connected via fasteners, the post of the lower fastener extends into a hole of the connecting cap located above, and the fourth inner flange 61 of the connecting cap located above is fastened by the fifth outer boss, so that the axial positions of two connected pieces are limited and the connection of the two connected pieces is realized. More crucially, the disassembly of screws is realized without tools which are possibly dangerous for children, such as screwdrivers, and the use safety of connecting members for robot pieces is greatly improved, so that it is advantageous for the popularization of robots in teenagers.

By providing a ninth rib 63 on the upper surface of the fourth inner flange 61, the circumferential position of the fifth outer boss relative to the fourth inner flange 61 may be limited. Consequently, the disengagement of two connected fasteners caused by the relative rotation of the fifth outer boss and the fourth inner flange 61 due to the vibration, loosing or other reasons is avoided, and the reliability of connection is improved.

By positioning the second lower positioning flange 64 and the connected pieces, the position of the connecting cap relative to the lower one of the connected pieces is ensured to be stable, and the connecting cap is coordinated with the upper surface of the outer slab to prevent the connecting cap from shaking on the connected pieces.

By providing a second limiting block 65 on the upper surface of the fourth inner flange 61, it may be avoided that the fifth outer boss escapes from another gap of the fourth inner flange 61 due to excessive rotation amplitude of the fifth outer boss when the connecting cap is connected to the fastener. Particularly, when a ninth rib 63 is provided on the upper surface of the fourth inner flange 61, a second limiting block 65 is provided besides the ninth rib 63, so the fifth outer boss may be stopped in the rotation process of the second inner flange, and the stop position is a position where the ninth groove of the fifth outer boss is matched with the ninth rib 63 of the fourth inner flange 61. Thus, during the rotation, it is avoided that the ninth rib 63 is rotated out from the ninth groove again after being rotated into the ninth groove and the mounting efficiency is improved. Moreover, the arrangement of the second limiting block 65 may also prevent the unexpected disengagement of the ninth groove and the ninth rib 63 in a certain direction, and the reliability of connection is also improved.

By providing the second outer bumps 66, it is convenient for users to hold fasteners and apply an enough torque to connect two fasteners. Particularly, when the fifth outer boss and the fourth inner flange are cooperatively connected by the groove and the rib, a certain acting force is to be transferred to the ninth rib 63 from the ninth groove to ensure the both to engage exactly. Particularly, by providing the second outer bumps 66, the contact length between the outer slab and the connected pieces may be increased, and the connection between the fasteners and the connected pieces may be more stable.

By providing the second transmission through hole 67, when a plurality of fasteners are connected together, a center bar may pass through the plurality of fasteners to drive the plurality of fasteners and the connecting cap to rotate together. For example, during arranging a robot in form of a vehicle, wheels may be provided on two sides of the vehicle, and each wheel and an arm for mounting the wheel is mounted via the fastener. Then, a long bar passes through the fasteners on the two sides of the vehicle to realize the synchronous rotation of the wheels on the two sides. Meanwhile, the bar members or platy pieces connected by the fasteners are not influenced, and the flexibility of the mechanical design is increased. This cannot be realized by the screw connection in the prior art. Moreover, by allowing non-circular pieces to pass through a plurality of fasteners and connecting caps, the plurality of fasteners and the connecting caps may be locked in the circumferential direction to avoid the relative relation between the fasteners and/or the connecting caps and thus improve the reliability of connection, and the anti-rotation effects at ninth recesses and ninth bumps may be replaced in a certain sense.

Embodiment 9

New reference signs have the following meanings: 71: first bar member; 72: second bar member; 73: third bar member; and, 74: fourth bar member.

An assembled component is provided, including:

a moving member, the moving member including bar members each having a width and a thickness, the width of each of the bar members being four times of the thickness, connecting through holes running through the bar members in a thickness direction of the bar members being provided on the bar members;

a plurality of connecting through holes running through the fixed member in a thickness direction of the fixed member being provided on the fixed member; and a fastener, which is any one fastener described above for passing through the connecting through holes to realize the connection between the moving member and the fixed member.

During assembly, the assembled component is convenient for assembly, and the connection between components is realized by tools possibly causing danger. Moreover, the connection is reliable and will not be unlocked unexpectedly, so that the loose of screws due to the relative rotation between connected pieces is avoided when the screws are used for connection. In addition, a transmission member may also be allowed to pass therethrough, without influencing the effects of the connected pieces.

FIGS. 35-38 show a case where four bar members are connected together by using the fastener in Embodiment 7 and the connecting cap in Embodiment 8.

The fourth bar member 74 is first sheathed on the bottommost fastener so that the connecting through holes of the fourth bar member 74 are matched with the upper positioning flange of the fastener; and then, the third bar member 73 is sheathed on the post 1 of the bottommost fastener. Subsequently, the middle fastener is sheathed on the bottommost fastener, and the fifth outer boss 51 of the bottommost fastener extends into the first hole of the middle fastener, so that the fifth outer boss 51 is slightly higher than the upper surface of the second inner flange 5 or aligned to the upper surface of the second inner flange 5. First outer bosses 12 of the two fasteners are held together, so that the middle fastener and the bottommost fastener do relative rotation and the fifth outer boss 51 is rotated on the upper surface of the second inner flange 5. Due to the presence of the chamfers, the fifth outer boss 51 will pass over the sixth rib 8 when encountering the sixth rib 8, so that the ninth groove is engaged with the sixth rib 8. As a result, the middle fastener is connected to the bottommost fastener. Meanwhile, the first lower positioning flange 53 of the middle fastener is matched with the connecting through holes of the third bar member 73, and the middle fastener and the bottommost fastener will be positioned due to the coordination of the positioning rib and the first lower positioning flange 53, so that the third bar member 73 may be connected to the fourth bar member 74.

In this case, the second bar member 72 and the first bar member 71 are successively sheathed on the middle fastener, so that the connecting through holes of the second bar member 72 are matched with the upper positioning flange 10 of the middle fastener. Subsequently, the connecting cap is sheathed on the middle fastener, and the fifth outer boss 51 of the bottommost fastener extends into the second hole of the middle fastener, so that the fifth outer boss 51 is slightly higher than the upper surface of the fourth inner flange 61 or aligned to the upper surface of the fourth inner flange 61. The first outer boss 12 of the bottommost fastener and the second outer boss 66 of the connecting cap are held together, so that the middle fastener and the bottommost fastener do relative rotation, and the fifth outer boss 51 is rotated on the upper surface of the fourth inner flange 61. Due to the presence of the chamfers, the fifth outer boss 51 will pass over the ninth rib 63 when encountering the ninth rib 63, so that the ninth groove is engaged with the ninth rib 63. Moreover, due to the presence of the second limiting block 65, the fifth outer boss 51 of the middle fastener will not pass over the ninth rib 63, so that the middle fastener is connected to the bottommost fastener. Meanwhile, the second lower positioning flange 64 of the middle fastener is matched with the connecting through holes of the first bar member 71, and the middle fastener and the bottommost fastener will be positioned due to the coordination of the positioning rib and the first lower positioning flange 53, so that the third bar member 73 may be connected to the fourth bar member 74.

It is also possible to allow a cross-shaped driving bar to the first transmission through holes of the middle and bottommost fasteners and the second transmission through hole 6767 of the connecting cap, so as to allow the driving bar to pass through the bar members, without influencing the functions of the bar members.

Figure 35:
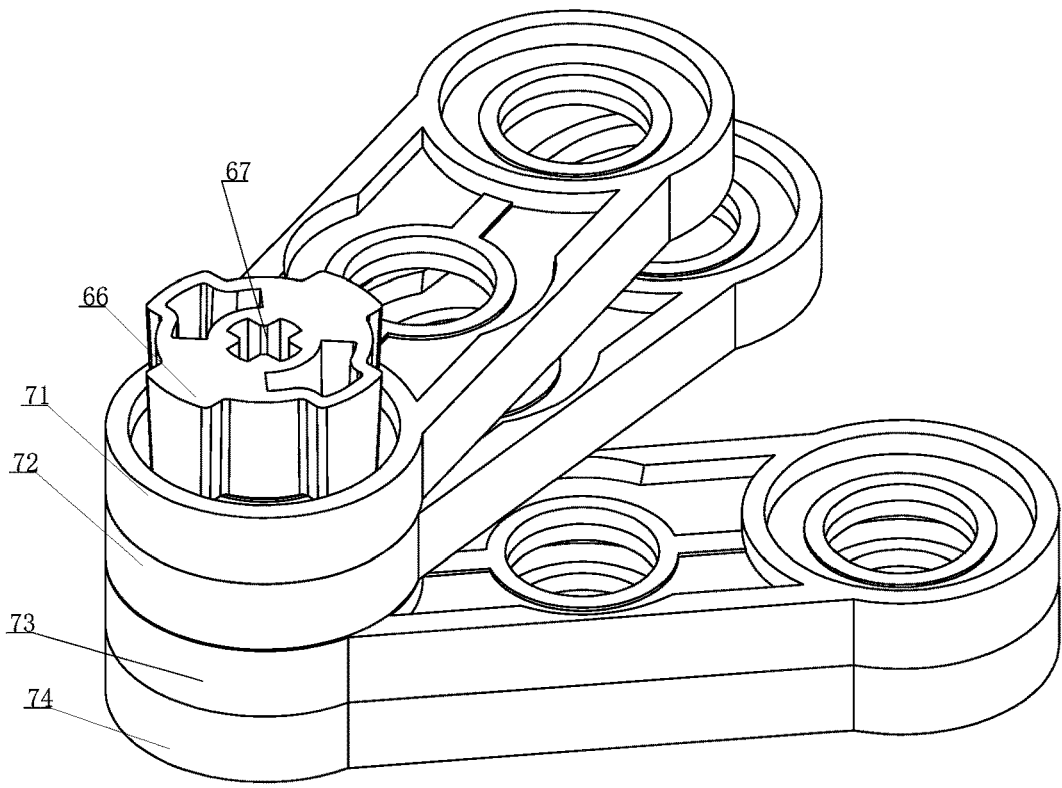
FIG. 35 is a stereoscopic diagram of connecting bar members together by a fastener and a connecting cap in Embodiment 9, when viewed from the inclined top.
Figure 36:
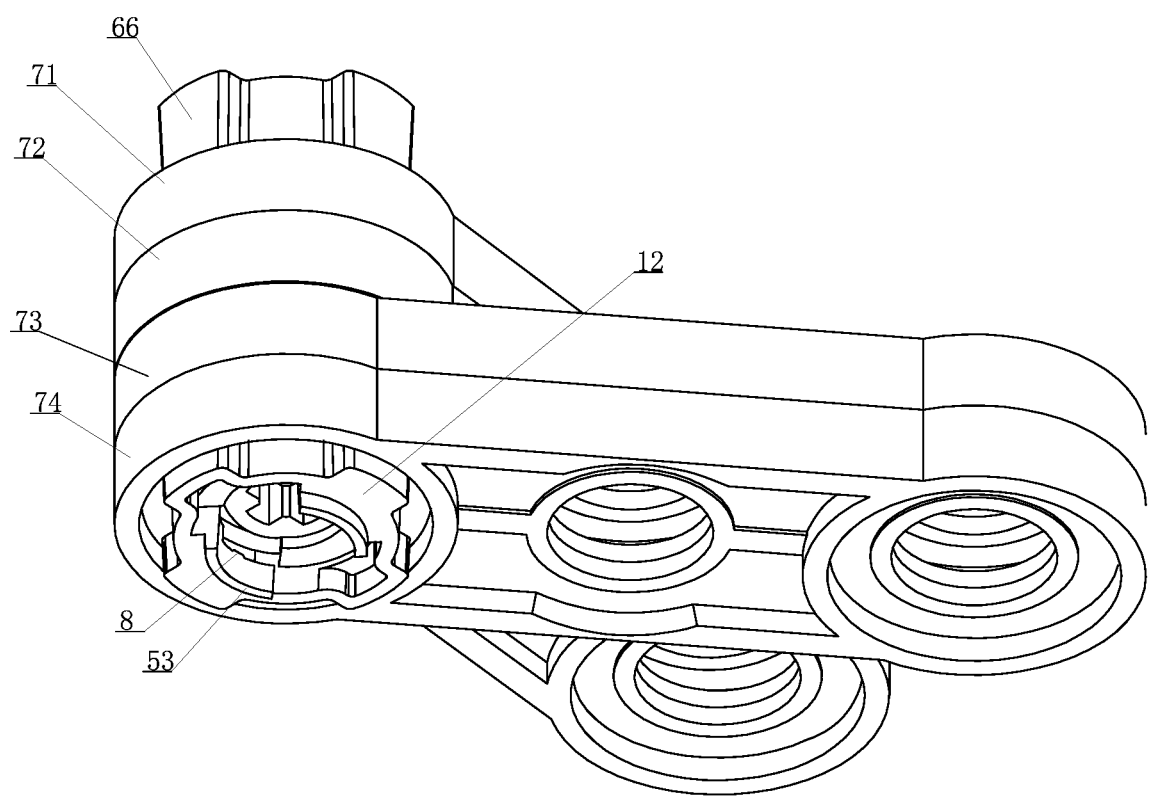
FIG. 36 is a stereoscopic diagram of connecting bar members together by a fastener and a connecting cap in Embodiment 9, when viewed from the inclined bottom.
Figure 37:
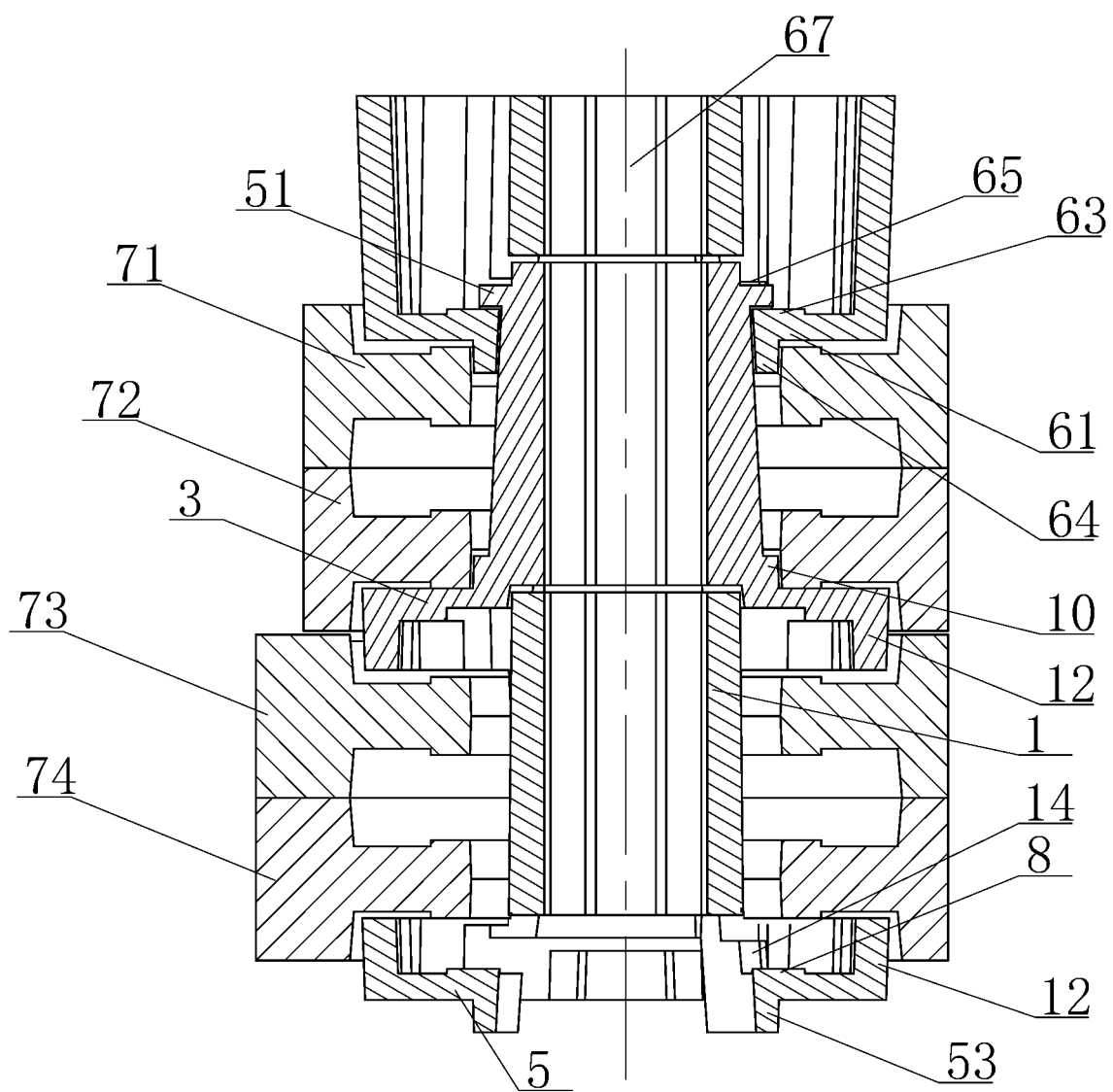
FIG. 37 is a sectional view of connecting bar members together by a fastener and a connecting cap in Embodiment 9, when viewed from one direction of a center line of the fastener.
Figure 38:
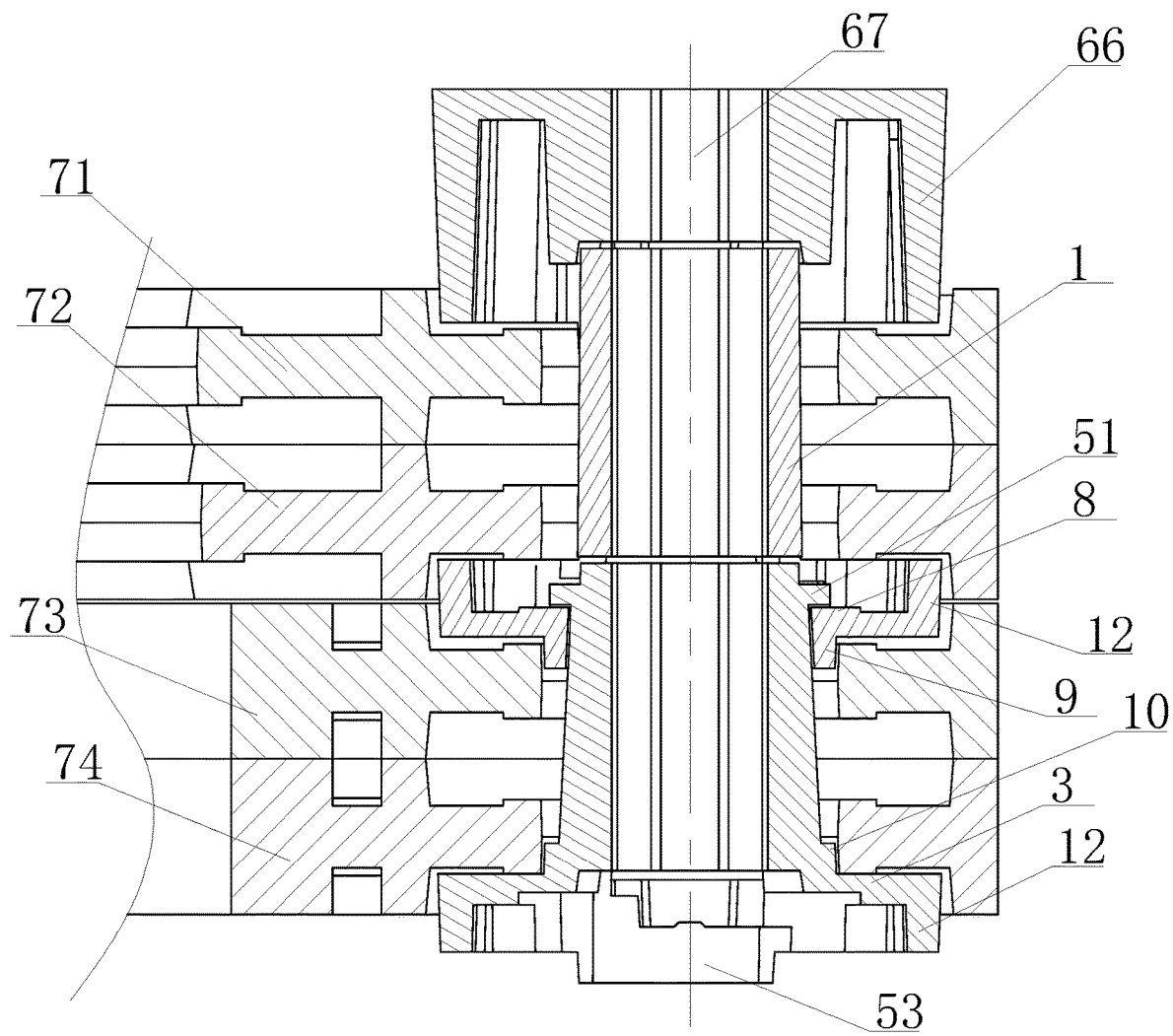
FIG. 38 is a sectional view of connecting bar members together by a fastener and a connecting cap in Embodiment 9, when viewed from another direction of the center line of the fastener.

Since only one connecting through hole of each bar member is connected via fasteners, the bar members may rotate relative one another. For example, FIGS. 35 and 36 show that the first bar member 71 and the second bar member 72 are staggered at a certain angle. However, the third bar member 73 and the third bar member 74 are aligned to one another. Thus, various states of the bar members are shown.

Embodiment 10

New reference signs have the following meanings: 75: fifth bar member; 76: third connecting hole; 77: fourth connecting hole; 78: first annular rib; 79: second annular rib; and, 80: connecting rib.

Preferably, a third connecting hole 76 and a fourth connecting hole 77 are formed on the moving member and/or the fixed member; the third connecting hole 76 is used for allowing the connected moving member and/or fixed member to do relative rotation when the fastener is connected to another fastener or the fastener is connected to a connecting cap; the fourth connecting hole 77 is used for allowing the connected moving member and/or fixed member to be clamped when the fastener is connected to another fastener or the fastener is connected to the connecting cap; and, a thickness of the moving member and/or the fixed member on an edge of the third connecting hole 76 is greater than a thickness of the moving member and/or the fixed member on an edge of the fourth connecting hole 77.

By configuring the third connecting hole 76 and the fourth connecting hole 77 into statuses of different hole wall heights, a same connecting member may be used and the third connecting hole 76 and the fourth connecting hole 77 may be used for rotatable connection and fixed connection, so that the diversity of connection of pieces is realized while ensuring the universality of the pieces.

Figure 39:
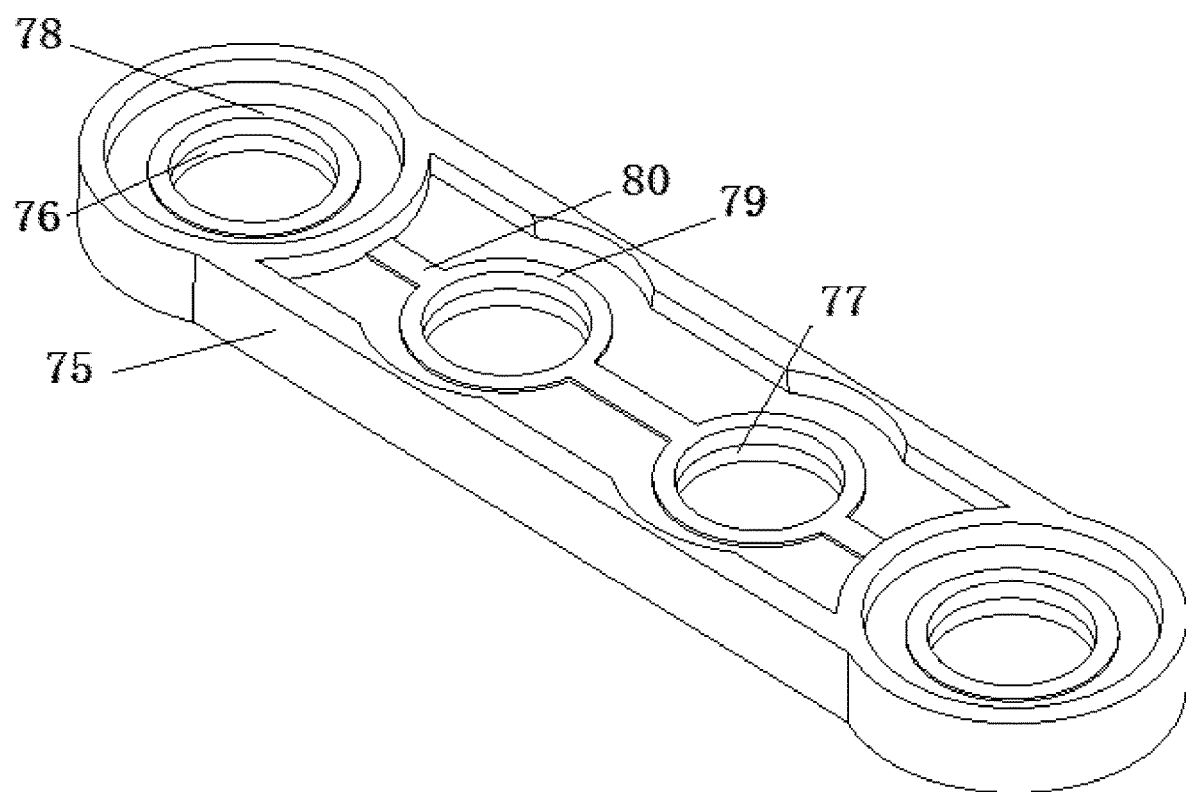
FIG. 39 is a stereoscopic diagram of a bar member in Embodiment 10.
Figure 40:
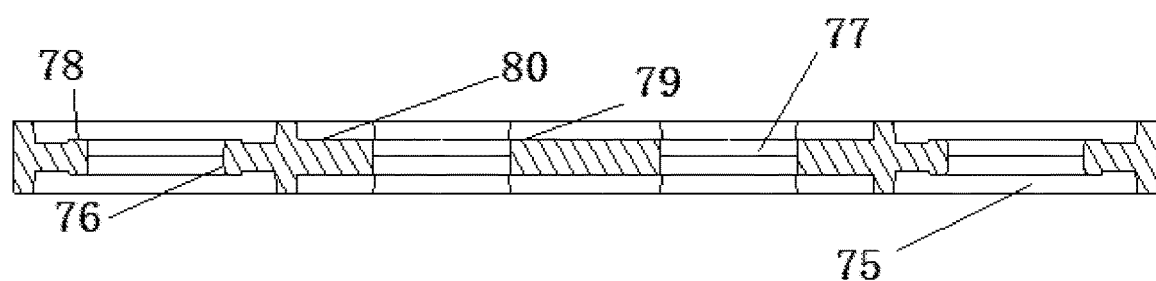
FIG. 40 is a sectional view of a vertical plane of the bar member of FIG. 39 in the length direction.
Figure 41:
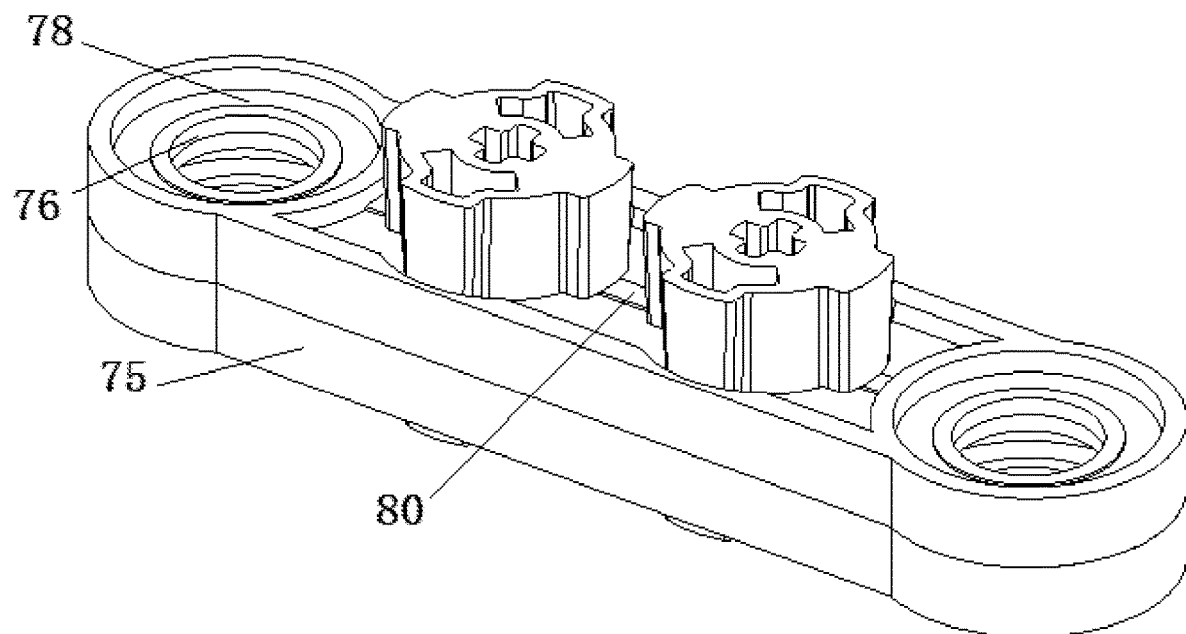
FIG. 41 is a stereoscopic diagram when two bar members of FIG. 39 are connected by a fastener and a connecting cap.
Figure 42:
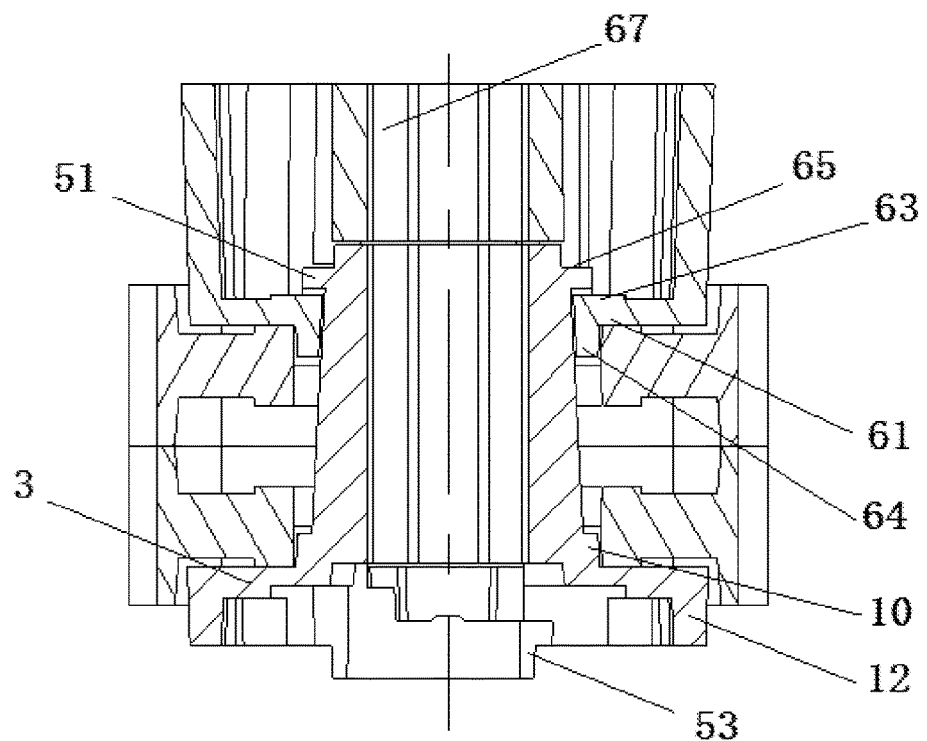
FIG. 42 is a sectional view of a vertical plane of the part assembly of FIG. 39 in the length direction of the bar member.
Figure 43:
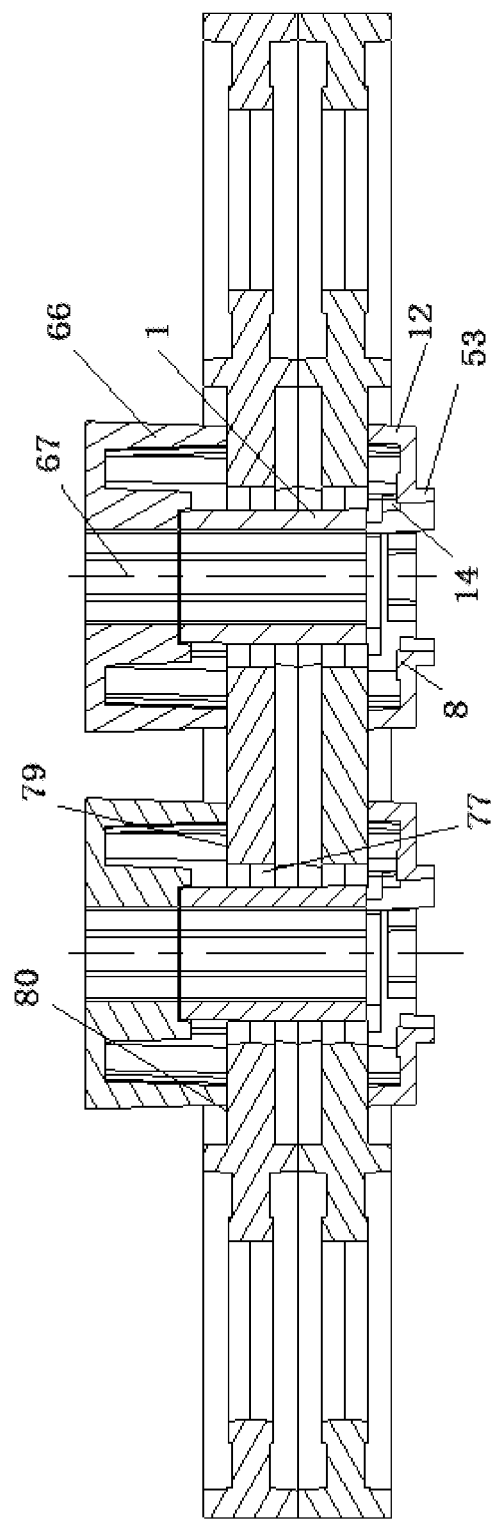
FIG. 43 is a sectional view of a vertical plane of the part assembly of FIG. 39 at a fourth connecting hole in a width direction of the bar member.

In FIGS. 39 and 40, a third connecting hole 76 used for hinge joint between pieces is formed at two ends of the fifth bar member 75, respectively, and two fourth connecting holes 77 are formed in the middle of the fifth bar member 75. The second annular ribs 79 on edges of the fourth connecting holes 77 are slightly higher than the first annular ribs 78 on edges of the third connecting holes 76, and collinear connecting ribs 80 are provided between two second annular ribs 79 on a same side of the bar member on the edges of the two fourth connecting holes, and provided on an outer side of the two second annular ribs 79. The height of the connecting ribs 80 is the same as the height of the second annular ribs 79. That is, the surfaces of the connecting ribs 80 are aligned to the surfaces of the second annular ribs 79. The upper surfaces of the second annular rib 79 and the connecting rib 80 on the upper portion of the fifth bar member 75 and the lower surfaces of the second annular rib 79 and the connecting rib 80 on the lower portion of the fifth bar member 75 form two surfaces clamped by the bottom surface of the connecting cap and the upper surface of the outer slab. In the connection shown in FIGS. 37 and 38 of Embodiment 9, there is a very small slit between the lower surface of the connecting cap and the first bar member; however, in FIGS. 42 and 43, there is no slit. This can be seen from the careful comparison of the four drawings.

Although the preferred embodiments of the present invention have been described above, the present invention is not limited to the above specific implementations. The above specific implementations are merely illustrative but not limiting. Various forms can be made by those skilled in the art under the teaching of the present invention, without departing from the objective of the present invention and the scope defined by the claims.

(1) The arrangement of the first bumps on the first outer boss and the second outer boss and the first recesses on the first inner flanges also plays the role of circumferentially positioning the first outer boss and the second outer boss relative to the first inner flanges. That is, changing the positions of the bumps and the recesses on the outer bosses and the inner flanges plays the same role.

(2) In Embodiment 1 or Variant 1, the first bumps are positioning ribs arranged on the upper surfaces of the first inner flanges. Actually, the positioning ribs may be replaced with one or more positioning columns which are arranged at the same positions as the first inner flanges. In this way, the positioning of the first outer bosses can be realized.

(3) In Embodiment 1, the first outer bosses are arranged in the radial direction of the post. Actually, the first outer bosses can be arranged eccentrically, that is, the center lines of the first outer bosses do not pass through the axis of the post. In this way, the same technical effects can be realized.

(4) In Embodiment 1, a pair of first outer bosses is provided, and correspondingly, two first grooves are provided on the first outer bosses. Two first ribs are provided on the two first inner flanges, and correspondingly, there are two upper positioning flanges and two first upper and lower positioning flanges. Actually, there may be three first outer bosses having an angle of 120° included between them. Similarly, there may be three first positioning ribs and three first lower positioning ribs, having an angle of 120° included between them.

(5) In Embodiment 1, four first outer bumps are provided on the outer edge of the outer slab. Actually, there may be three or five or another number of first outer bumps, as long as the purpose of torque transfer is realized. Even, the outer edge of the outer slab can be knurled or manufactured in a shape of a corrugated handwheel.

(6) In Embodiment 1, the first outer bump on the outer side of the outer slab has a same thickness as the outer slab. Actually, the first outer bump may be replaced with a partially spherical bulge or a cylinder arranged in the radial direction of the post, so as to play a same role as the first outer bump.

(7) In Embodiment 1, the first recess is a groove matched with the first rib. Actually, if the first bump is a partially spherical bulge, the first recess may be a partially spherical pit or a cylindrically recessed pit. Or, if the first bump is a protruded cylinder, the first recess may be a cylindrically recessed pit.

(8) In Embodiment 1, both the upper surface of the first outer boss and the lower surface of the second outer boss are slopes. Actually, it is possible that only one of the two is a slope, and correspondingly, the first inner flange is wedge-shaped. In this way, both the axial positioning and the radial positioning can be realized.

(9) In the drawings used in Embodiment 1, it is shown that the first occlusion portions between the first outer boss and the second outer boss are communicated with both of them. Actually, the first occlusion portions may be arranged on only one of the first outer boss and the second outer boss, or directly arranged on the outer wall of the post without being communicated with both the first outer boss and the second outer boss, as long as the first occlusion portions are high enough to occluding the relative rotation of the first inner flanges. The specific height of the first occlusion portions may be determined by those skilled in the art according to factors such as material and the output torque of the user, which will not be described here.

(10) In the drawings used in Embodiment 1, it is shown that an outer flange is arranged along the lower edge of the outer slab, and forms a complete ring on the lower edge. Actually, the outer flange may be arranged in the middle or in the lower-middle part of the side of the outer slab. Or, the outer flange may be not a continuous and complete ring, and instead, it may be distributed in such a way that there is a flange in ¼ portion and there is no flange in another ¼ portion.

(11) Since the width of the first outer boss is not very large, actually, the width of the second inner flange and the width of the first gap may be designed to be ⅙ and ⅓ of the circumference of the inner wall at this height. Or, in Variant (4), both the width of the second inner flange and the width of the first gap are designed to be ⅙ of the circumference of the inner wall at this height. The width of the third inner flange in Embodiment 3 may be designed in a similar way.

(12) In Embodiments 4-6, the fastener passes through the first through hole in the upper one of two three-hole bar members connected by a same fastener and the second through hole in the lower splicing piece. Actually, the fastener can also pass through the first through hole in the lower splicing piece, because there is no structure for positioning provided on the outer side of the post in this region. Therefore, in which through hole the lower splicing piece is passed by the fastener is not limited by the type of the through hole. Furthermore, when it is unnecessary to circumferentially fix the upper splicing piece to the fastener, the fastener may also pass through its second through hole, and the relative rotation of the two is not influenced, as long as the upper splicing piece is axially limited, for example, by the coordination of the connecting cap and the third outer boss.

(13) As described in Embodiment 7, the splicing of the robot is realized by the fastener and the splicing pieces. Actually, the fastener and the splicing pieces can be used for the splicing of building blocks or toys, or for the splicing of the training tools in classes, or for the splicing of the simple mechanical motion models used in the research courses in scientific research institutions, or the like. They are not limited to a single usage of splicing robots.

(14) As described in Embodiment 1, an upper positioning flange is provided at the junction of the post and the outer slab. Actually, a fence may be provided on the upper slab or an annular outer flange may be provided on the lower surface of the outer circumferential surface of the post. All of these can play a role of radially positioning the fastener and the parts to be connected below the fastener.

(15) In Embodiment 9, the two connecting bars in the upper portion are connected together by one connecting cap and two fasteners below the connecting cap. Actually, the fastener can be used as a component, which is above the middle fastener, for fixing the first bar member.

(16) In Embodiment 10, a first annular rib and a second annular rib are provided to control different thickness of the third connecting hole and the fourth connecting hole at their edges, so as to distinguish the fixed connection and hinged connection of the fastener. Actually, only one annular rib may be provided, without providing any annular rib in the other connecting hole, with a very small difference in height reserved between them. In this way, the same purpose can be realized.

All of these variants are within the protection scope of the present invention.

What is claimed is:

1. A device, comprising a fastener and a splicing piece suited with the fastener, wherein:
   at least a local portion of the splicing piece is a platy portion;
   connecting through holes are provided in the platy portion;
   the connecting through holes include a first through hole;

a first inner flange is provided on an inner wall of the first through hole;
the fastener includes a post, a plurality of outer bosses, an outer slab, a first hole and a second inner flange;
the plurality of outer bosses are provided in an upper portion of the post;
the plurality of outer bosses include a first outer boss, a second outer boss and a third outer boss;
the first outer boss is located under the second outer boss;
an upper surface of the first outer boss and a lower surface of the second outer boss are used for clamping the first inner flange;
the outer slab, which is perpendicular to the post, is provided in a lower portion of the post;
the outer slab, the first outer boss and the second outer boss are used for limiting positions of a plurality of connected splicing pieces along a height direction of the post;
the third outer boss is provided on a top of the post;
the first hole is formed within a local region of the outer slab under the post;
the second inner flange is provided on an inner wall of the first hole;
the second inner flange has a first gap greater than a width of the third outer boss; and
an upper surface of the second inner flange is used for abutting a lower surface of the third outer boss when limiting a position of the connected splicing piece along the height direction of the post.

2. The device in claim 1, wherein:
the first outer boss and the second outer boss are located at different positions along a length direction of the post;
in a plane of an axis of the post, the upper surface of the first outer boss and the lower surface of the second outer boss form a wedge-shaped gap with a smaller interior and a larger exterior; and
at least one of the upper surface of each of the first outer bosses and the lower surface of each of the second outer bosses is a slope which forms an acute angle with an axis of the post.

3. The device in claim 1, wherein:
the plurality of outer bosses include a pair of first outer bosses and a corresponding pair of second outer bosses;
the pair of first outer bosses extend outward in a radial direction of the post; and
the pair of first outer bosses and the pair of second outer bosses are oppositely provided in a circumferential direction of the post.

4. The device in claim 3, wherein:
a first groove is provided on the upper surface of each of the pair of first outer bosses;
another first groove is provided on the lower surface of each of pair of the second outer bosses; and
the pair of first grooves have opposite positions.

5. The device in claim 4, wherein an upper surface and a lower surface of the first inner flange are provided with third ribs matched with each of the pair of first grooves.

6. The device in claim 3, wherein:
chamfers are further provided on two side edges of the lower surface of each of the pair of first outer bosses; and
the chamfers are substantially parallel to the radial direction of the post.

7. The device in claim 4, wherein:
the pair of first outer bosses and the pair of second outer bosses are oppositely provided in the circumferential direction of the post; and
first occlusion portions for occluding the first inner flange are provided on a same side of the pair of first outer bosses and the pair of second outer bosses.

8. The device in claim 7, wherein:
the plurality of outer bosses include multiple combinations of the first outer bosses and the second outer bosses; and
the first occlusion portions between a first outer boss and a second outer boss of each pair of the outer bosses in the combinations are in a same rotation direction of the first grooves.

9. The device in claim 1, wherein two sections of the first inner flange and two sections of the first gap are provided on the inner wall of the first hole in a staggered manner.

10. The device in claim 1, wherein:
a sixth rib is further provided on the upper surface of the second inner flange; and
the sixth rib is coordinated with a groove on the lower surface of the third outer boss to realize circumferential positioning of two connected fasteners.

11. The device in claim 1, wherein an outer flange is provided on a side face of the outer slab.

12. The device in claim 1, wherein an upper positioning flange is provided on an upper surface of the outer slab.

13. The device in claim 10, wherein:
a first limiting block for limiting a relative rotation angle of the third outer boss relative to the first inner flange is provided on an upper surface of the first inner flange; and
a position of the first limiting block is where a side face at a front end of the third outer boss in a rotation direction is located when the groove on the lower surface of the third outer boss exactly moves to the sixth rib.

14. The device in claim 1, wherein four first outer bumps used for accepting and transferring to the outer slab a torque for allowing the fastener to rotate are further provided on an outside surface of the outer slab.

15. The device in claim 1, wherein:
a first transmission through hole is formed in a middle portion of the post; and
the first transmission through hole is used for allowing a piece to pass through the first transmission through hole for driving the fastener to rotate in a circumferentially relatively fixed manner.

16. The device in claim 15, wherein the first transmission through hole has a cross-shaped cross section to drive the fastener to rotate via a transmission piece.

17. The device in claim 15, wherein the first transmission through hole has an orthohexagonal cross section to drive the fastener to rotate via a transmission piece.

18. The device in claim 15, wherein the first transmission through hole has a square cross section to drive the fastener to rotate via a transmission piece.

19. The device in claim 15, wherein the first transmission through hole has a regular-triangle cross section to drive the fastener to rotate via a transmission piece.

20. The device in claim 1, wherein:
the first outer boss and the second outer boss are oppositely provided in a circumferential direction of the post;
the first outer boss and the second outer boss are provided with a first bump or a first recess facing each other;

a groove is provided on the upper surface of the first outer bosses;
a groove is provided on the lower surface of the second outer bosses;
the grooves have opposite positions; and
the upper surface and lower surface of the first inner flange are provided with a rib matched with the grooves.

\* \* \* \* \*